US012595758B2

(12) United States Patent
Collett et al.

(10) Patent No.: US 12,595,758 B2
(45) Date of Patent: Apr. 7, 2026

(54) OPTIMAL EFFICIENCY INTERNAL COMBUSTION ENGINE

(71) Applicants: Glen Alton Collett, Sandy, UT (US); Ernest Emanuel Rogers, Pleasant Grove, UT (US)

(72) Inventors: Glen Alton Collett, Sandy, UT (US); Ernest Emanuel Rogers, Pleasant Grove, UT (US)

(73) Assignee: CREED Engines LLC, Sandy, UT (US)

(*) Notice: Subject to any disclaimer, the term of this patent is extended or adjusted under 35 U.S.C. 154(b) by 898 days.

(21) Appl. No.: 17/817,350

(22) Filed: Aug. 3, 2022

(65) Prior Publication Data

US 2024/0044284 A1 Feb. 8, 2024

(51) Int. Cl.
*F02B 33/44* (2006.01)
*F02B 75/28* (2006.01)

(52) U.S. Cl.
CPC ............ *F02B 33/44* (2013.01); *F02B 75/282* (2013.01)

(58) Field of Classification Search
CPC ......... F02B 33/44; F02B 75/282; Y02T 10/12
See application file for complete search history.

(56) References Cited

U.S. PATENT DOCUMENTS

| | | | | | |
|---|---|---|---|---|---|
| 1,406,319 | A * | 2/1922 | Wygodsky | F01L 13/00 | 91/181 |
| 2,112,829 | A * | 4/1938 | Colburn | F01B 7/12 | 123/53.1 |
| 2,494,890 | A * | 1/1950 | Mallory | F01B 7/14 | 119/900 |
| 2,507,923 | A * | 5/1950 | Morris | F02B 73/00 | 92/69 R |
| 2,748,757 | A * | 6/1956 | Morris | F02B 25/00 | 123/294 |
| 3,338,137 | A * | 8/1967 | James | F01C 9/002 | 123/18 R |
| 3,910,239 | A * | 10/1975 | James | F02B 75/16 | 123/18 R |
| 3,970,057 | A * | 7/1976 | Schauer | F02B 25/00 | 123/51 BD |

(Continued)

FOREIGN PATENT DOCUMENTS

| | | | | |
|---|---|---|---|---|
| CH | 183763 | A * | 4/1936 | F01B 7/12 |
| DE | 2923941 | A1 * | 5/1981 | |

(Continued)

*Primary Examiner* — Hung Q Nguyen

(57) ABSTRACT

An internal combustion engine operating generally in accordance with a thermodynamic cycle called the General Cycle, achieving maximum efficiency with limited pressure and temperature, and having an expansion ratio $R_E$, a compression ratio $R_C$ and an Atkinson ratio A. The Atkinson ratio is in the range from 1.1 to 1.8, the expansion ratio is in the range from 22 to 50, and the compression ratio is in the range from 20 to 36. Given engine parameters, an optimum efficiency $R_E$-$R_C$ pair can be determined. The engine may include a high ratio of stroke length to bore, or may be of an opposed piston construction.

11 Claims, 15 Drawing Sheets

(56) References Cited

U.S. PATENT DOCUMENTS

| | | | | | |
|---|---|---|---|---|---|
| 4,305,349 | A * | 12/1981 | Zimmerly | F01B 7/12 | 123/51 BB |
| 4,955,328 | A * | 9/1990 | Sobotowski | F02B 73/00 | 123/59.6 |
| 2003/0014971 | A1 * | 1/2003 | Scuderi | F02G 1/0535 | 60/614 |
| 2005/0103288 | A1 * | 5/2005 | Edwards | F02B 75/32 | 123/51 R |
| 2010/0071671 | A1 * | 3/2010 | Lemke | F02B 75/28 | 123/197.3 |
| 2011/0186005 | A1 * | 8/2011 | Lemke | F16C 9/04 | 123/197.1 |
| 2011/0186017 | A1 * | 8/2011 | Lemke | F16C 9/04 | 123/51 R |
| 2012/0037130 | A1 * | 2/2012 | Fuqua | F16C 9/04 | 74/43 |
| 2012/0330534 | A1 * | 12/2012 | Cleeves | F02D 41/10 | 701/104 |
| 2015/0315912 | A1 * | 11/2015 | Anderson | F02B 55/14 | 123/200 |

FOREIGN PATENT DOCUMENTS

| | | | | |
|---|---|---|---|---|
| EP | 0278552 | A2 * | 8/1988 | F02F 1/20 |
| GB | 2112454 | A * | 7/1983 | F02F 7/0087 |

* cited by examiner

*General Cycle with Limited Temperature*

OPTIMAL EFFICIENCY INTERNAL COMBUSTION ENGINE

This is a continuation-in-part of U.S. patent application Ser. No. 17/160,356 filed Jan. 27, 2021 and claiming the benefit of U.S. Provisional Patent Application No. 62/969,090 filed Feb. 2, 2020.

BACKGROUND

We on earth (8.0 billion people in 2022) are destroying our planet by wasteful use of resources, and in particular by wasting energy. Of all the vast production of energy on the planet, now at over $600\times10^{15}$ BTUs (630 EJ) per year, about 80% is from burning fossil fuels at very low efficiency. Renewable energy sources are beginning to replace fossil fuel use, but the best solution in the near term, to meet our energy needs with far less dependence on fossil fuels, is to improve energy efficiency of fuel use. Our invention—a high efficiency engine—is directed to that purpose. It is particularly useful for combined heat and power applications where a combined efficiency of 90% or more may be achieved. Our engine, or engines, are ideally suited for use with renewable fuels.

PRIOR ART

The scientific principles of operation of internal combustion engines have been known for approximately 130 years, after Rudolph Diesel first applied the concept of the thermodynamic cycle in 1892, just 16 years after the foundation concepts were introduced by Willard Gibbs. Modern theory of the thermodynamic cycles of internal combustion engines began with Diesel's work. In Diesel's U.S. Pat. No. 608,845, he presents what has become known as the "Diesel cycle." Today, the five well-known internal-combustion engine cycles are represented by standard reversible forms composed of isentropic, isochoric, and isobaric process steps. Those five cycles are: Diesel cycle, Otto cycle, dual cycle, Brayton cycle, and the Atkinson (or Miller) cycle. It was not generally known until recently that a sixth comprehensive standard thermodynamic cycle includes and extends the five prior cycles—we refer to this improved cycle as The General Cycle.

BRIEF SUMMARY OF THE INVENTION

A thorough description of the General Cycle is provided in the reference: Ernest Rogers, "Calculating Engine Efficiency with the General Cycle Equation," May, 2020, available on-line at the following web address: https://www.researchgate.net/publication/341133935_Calculating_Engine_Efficiency_with_the_General_Cycle_Equation The above referenced paper by one of the applicants is reproduced substantially in its entirety herein.

Calculating Engine Efficiency with the General Cycle Equation

Ernest Rogers •May 4, 2020

As used here, a thermodynamic cycle is a sequence of changes in the conditions of a gas; the final step returns the gas to its initial condition. The General Cycle will be described in terms of reversible changes of an ideal gas. Most heat engines can be analyzed by use of such an "ideal" cycle. Only the essential steps are included—for example, in representing a four-stroke engine, the two strokes for exchanging the gas will be ignored.

The General Cycle has this name because it is capable of representing most commonly-used internal combustion engines, such as carbureted gasoline engines, Atkinson engines, diesels, and even gas turbine engines. By assuming that gas properties—the specific heats and specific heat ratio—are constants, a very simple formula can be obtained for heat engine efficiency. This simple formula is remarkably accurate in predicting the efficiency of real engines when 1.35 is used for the "constant" value of the specific heat ratio, and an energy loss factor is judiciously applied. (The analysis leading to the formula is for a reversible cycle with no heat or friction losses.)

One may ask, why is this formula for efficiency needed? The answer is that it is a teaching tool that shows us how to develop more efficient engines.

Describing the Cycle

The steps of the cycle are shown on the P-V Diagram (FIG. 1). The cycle has the following steps:

I. Starting at point 1, a gas is compressed adiabatically (without heat transfer) from $V_1$ to $V_2$. The compression ratio is $R_C=V_1/V_2$. The pressure increases from $P_1$ to $P_2$. The compression work from point 1 to point 2, $W_{12}$, is negative.

II. A first heat (fuel) input $Q_1$ raises pressure from $P_2$ to $P_3$ at constant volume. This $P_3$ is the maximum pressure. No work is done and $V_3=V_2$.

III. A second heat input $Q_2$ is added at constant pressure as the piston begins to move outward from $V_3$ to $V_4$. (Fuel began to burn at point 2 and burning is complete at point 4.) The total heat input is $Q_{IN}=Q_1+Q_2$. The work from point 3 to point 4 is $W_{34}$.

IV. The gas expands adiabatically from point 4 to point 5. The power stroke ends at point 5. The expansion ratio $R_E=V_5/V_2$ exceeds the compression ratio by the factor $A=V_5/V_1$. A is the Atkinson ratio. The work in this step, from point 4 to point 5, is $W_{45}$.

V. Heat is removed at constant volume. ($V_6=V_5$) Pressure decreases from $P_5$ to $P_1$, the initial pressure. ($P_6=P_1$)

VI. The gas is compressed and heat is removed at constant pressure. The volume decreases from $V_5$ to $V_1$, the initial volume, and the temperature returns to the initial temperature, $T_1$. ($V_6=V_5$) The work from point 6 to point 1, $W_{61}$, is negative.

The cycle is complete. The total heat removed in steps V and VI is the rejected heat, $Q_{OUT}$. The total work available from the cycle is $W=W_{12}+W_{34}+W_{45}+W_{61}$. In the ideal cycle, $W=Q_{IN}-Q_{OUT}$. In a real engine, the process is a little different than this ideal cycle—the steps will not be so neatly defined. The real engine is expected to have valves; for example: valves open at point 5 to remove exhaust gas. A fresh charge of air enters and the piston returns to point 1, the starting point. Then the valves are closed and a new cycle begins. Opening of valves in part of the cycle can cause a loss of work, as work against the atmosphere.

The efficiency of the cycle is obtained by comparing the total work W to the total heat input $Q_{IN}$. Efficiency is a dimensionless quantity. The efficiency of this ideal cycle can be expressed in terms of a set of defined dimensionless parameters for the cycle. The equation for cycle efficiency is:

$$\eta = 1 - \frac{\alpha\beta^{\gamma}A^{1-\gamma} + A\gamma - A - \gamma}{[\alpha(\beta-1)\gamma + \alpha - 1]R_C^{\gamma-1}}$$

Where $\eta$ is the ideal efficiency, $\alpha=P_3/P_2$ is the pressure ratio, $\beta=V_4/V_3$ is the cutoff ratio ($V_3=V_2$), $A=V_5/V_1$ is the Atkinson ratio, $R_C$ is the compression ratio, and $\gamma=C_P/C_V$ is the specific heat ratio.

As already mentioned, this equation encompasses most common engine cycles. If $\beta=1$, the equation simplifies to the equation for the Atkinson cycle. If this is further restricted to $A=1$, it becomes the Otto cycle. By setting $A=1$ only, you obtain the dual cycle. If you set $\alpha=1$ and $A=1$, you obtain the classical Diesel cycle. If you set $\alpha=1$ and $A=\beta$ it becomes the Brayton cycle.

In order to make good use of the General Cycle equation, one must have some understanding of what limits should be placed on the selectable parameters, $\alpha$, $\beta$, A, and $R_C$. Then the equation can be the starting point of a search for a more efficient engine.

DETAILED DESCRIPTION

Figure 1:
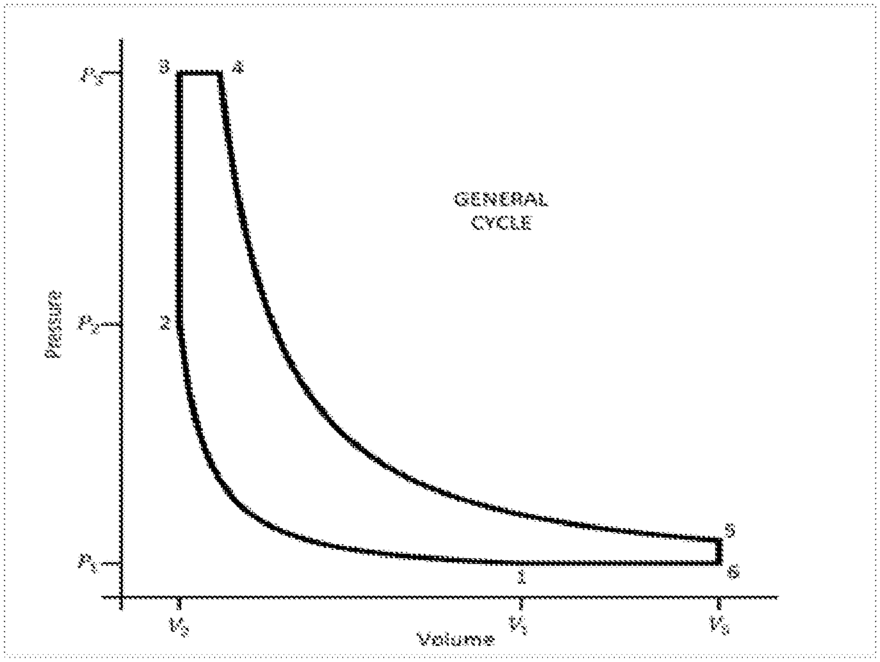
FIG. 1 shows the P-V diagram of a thermodynamic cycle which is called the General Cycle.

In order to describe our invention, it will be necessary to review the scientific principles pertaining to it and to define terms. As currently practiced, our invention is a two-stroke direct-injected piston engine that is represented by the General Cycle. Nevertheless, the General Cycle is also applicable to four-stroke engines. In a four-stroke engine, the two strokes that transfer the exhaust out of the engine and intake a fresh charge of air may be ignored, while the other two strokes, the compression and power strokes, are represented in the General Cycle. General Cycle The General Cycle is an idealized thermodynamic cycle that can represent most, if not all, common internal combustion engines. Usually it is analyzed as a sequence of reversible steps performed on a compressible working fluid. In a real engine, this compressible fluid is a gas comprising oxygen with any amount of other gases, such as air or a gas composed of air, fuel, or combustion products. The General Cycle is best understood by reference to the P-V diagram of FIG. 1. It has the following steps:

I. Starting at point 1, a fresh charge of compressible fluid is compressed from volume $V_1$ to volume $V_2$. The compression ratio is $R_C=V_1/V_2$. Pressure increases from $P_1$ to $P_2$. The compression work from point 1 to point 2, defined as $W_{12}$, is negative.

II. Beginning at point 2, a first heat input $Q_1$ from fuel raises the pressure from $P_2$ to $P_3$, at constant volume. This $P_3$ is the maximum pressure, and $V_3=V_2$.

III. Beginning at point 3, a second heat input $Q_2$ is added at constant pressure as the piston moves outward from $V_3$ to $V_4$. Fuel had begun to burn at point 2, and burning is complete at point 4. The total heat input is $Q_{IN}=Q_1-Q_2$. The expansion work from 3 to 4 is $W_{34}$.

IV. After the hot compressible fluid (combustion gas) expands from point 3 to point 4, it continues to expand to $V_5$ without further heat input. The power stroke is complete at point 5. In our engines, point 5 is at a substantially greater volume than point 1. The expansion ratio is defined as $R_E=V_5/V_2$ and exceeds the compression ratio by the factor $A=V_5/V_1$. A is called the Atkinson ratio. It is equivalent to $A=R_E/R_C$. The work from 4 to 5 is $W_{45}$.

V. In this final step of the General Cycle, the engine returns from point 5 to the starting point 1 of FIG. 1. For a two-stroke engine, the exhaust valve (or valves) open at point 5 and intake valve(s) are opened shortly afterward. A fresh charge of compressible fluid enters as the piston moves from $V_5$ toward $V_1$. This fluid is most commonly air with other optional components, but may in some constructions consist of any other suitable gas, as for example a mixture of inert gas, oxygen, and water vapor. In the two-stroke engine examples illustrated by schematic FIGS. 3 and 4, the exhaust valve (or valves) close last as the piston(s) approach the starting position of point 1; then a new cycle begins. The above General Cycle applies equally well to a four-stroke engine. For the four-stroke engine, Step V comprises having exhaust valve(s) open as pistons complete an exhaust stroke, and then an intake stroke follows with the exhaust valve(s) closed and intake valve(s) open as the piston moves toward the outward position; intake valve(s) continue to stay open until the piston moves back inward and approaches the starting point 1.

This recharge Step V is inherently irreversible and represents a departure from the fully reversible cycle model as explained in the referenced article by applicant Rogers. In the fully reversible case, this portion of the cycle is assigned two steps: first, a reduction of pressure at constant volume, and then a reduction of volume at constant pressure, to return to the starting point of the closed cycle. Opening the cycle as described here causes a loss of work against the atmosphere. The work against the atmosphere, $W_{ATM}$, is negative. The total work of this cycle is $W=W_{12}+W_{34}+W_{45}+W_{ATM}$. The efficiency of the cycle is obtained by dividing the total work W by total heat input $Q_{IN}$.

We caution that while the above explanation of the General Cycle is of great benefit for understanding our invention, it represents a particular example and only approximates processes that may occur in a real engine built according to the invention. One may, for example, program the rate of heat input $Q_2$ so as to restrain the maximum gas temperature (rather than maintaining constant pressure as described above) and thereby prevent formation of nitrogen oxides by nitrogen and oxygen molecules present in the combustion gas. Such a useful variation from the General Cycle should be understood to fall within the scope of our invention.

The present invention achieves its major benefits by making use of the unique features of the General Cycle. It is noted that the commonly known internal combustion engine cycles, Otto, Atkinson, Diesel, Brayton and the dual cycle are encompassed by the General Cycle as special cases of it. It is common in the art to refer to a cycle as the least general designation which encompasses all of the cycle's activity. For example, the Otto cycle is a special case of the Atkinson cycle, in which the Atkinson ratio is 1. An engine by that design is referred to as an Otto cycle engine, not as an Atkinson cycle engine. We use the terminology of the General Cycle in a similar way. Our General Cycle engines make use of all of the features of the General Cycle, and do not fall into a special case or category in which one of the other cycles may be the more appropriate terminology. Therefore, we can expect an engine using the General Cycle to use, at least in some fashion, two heat inputs, the first at substantially constant volume, and the second in which the fuel is metered at such a rate that the pressure is held substantially constant, up to the point of fuel cut-off. At least that is the idealized view of what the engine is doing; in the reality of a physical engine the piston is always moving and there is never actually an exactly constant volume, and likewise there is not a perfectly constant pressure. Much of any ideal cycle's description and computations are approximations to the real physical system. These ideal constructs aid our understanding and allow us to achieve good engine designs with reasonable effort.

The General Cycle as presented above does not include a constant-temperature step. However, as currently practiced, the General Cycle may now be extended to include a constant-temperature step. We call this the Temperature Limited General Cycle. All aspects and examples of our invention can be operated in a fashion to include a constant-temperature process with only minor adjustments being required in the fuel injection programming. Near the conclusion of the Detailed Description, we will present a full description of the Temperature-Limited General Cycle. Any engine construction that we may describe herein regarding our invention may optionally include a constant-temperature process as later detailed in the presentation of the Temperature-Limited General Cycle. This cycle has substantially the same sequence of thermodynamic steps as before with the addition of a constant-temperature portion during the last part of heat input.

DESCRIPTION OF THE INVENTION

The General Cycle has been described above as a reversible thermodynamic cycle operating on a perfect gas as the working fluid. This cycle has been used as a design basis for practical engines having improved performance and efficiency in many applications. Engines based on the General Cycle have two preeminent features: (1) control of maximum gas pressure, and optionally control of maximum temperature, as desired for best operation at each power level, and (2) compression ratio and expansion ratio are chosen to obtain best performance within design constraints of any particular application, as may be most desirable, in a great many applications. We will show below that the expansion ratio of an internal combustion engine is the first determiner of efficiency, and that in any particular engine design having a selected expansion ratio, there is a corresponding compression ratio needed to achieve the best engine efficiency. We will further show that for any such particular engine design with a selected expansion ratio, there exists a maximum achievable efficiency. This best efficiency is obtained by use of a certain optimum compression ratio.

By application of the principles we have discovered, one can obtain optimal engine designs for a great variety of applications. One may for example choose to design an engine to achieve a desired level of efficiency, such as 60% brake efficiency, or a design may be selected that provides the best efficiency within certain design constraints such as a desired level of specific power. Finally, we will show that for a great many optimal engine designs utilizing the General Cycle model, the best combinations of compression ratio and expansion ratio fall within certain defined boundaries.

Our design principles and conditions for optimal engine design will be illustrated through several specific examples—two will be two-stroke engines of exceptionally high efficiency and a third example will be a four-stroke engine that may be more suitable for use in large trucks or off-road equipment. We have found that a two-stroke, direct-injected engine generally working in accordance with the General Cycle is superior to other engines regarding the combined properties of efficiency, power density, and ease of construction. This fact is illustrated by the first two engine examples we will present. In a third example engine of a four-stroke design, we will show how our invention may also be applied to construct an engine suited to a particular purpose that is highly efficient and that also has good power density, or specific power, in four-stroke operation.

Our invention concerns the application of General Cycle principles and other conditions to the construction of efficient engines. We will show how they may be applied in novel, high-efficiency engine constructions.

Now, in a first instance, we have found in our work that a practical upper limit of efficiency exists for internal combustion engines of our design. For our engines of most efficient and practical design, best efficiency lies in the general range of 50 to 60 percent brake efficiency or may be even higher, depending on the fuel used. In order to obtain an optimum brake efficiency of approximately 60 percent or greater the following inequality must be satisfied:

$$AR_C \geq 36.33+8788\, e^{-0.375\, R_C} \quad (1)$$

For these highly efficient engines, the most desirable values of compression ratio, $R_C$, are in the range from 19 to 30. The design property of Inequality 1 determines highly desired values for $AR_C$, which is the product of Atkinson ratio, A, and compression ratio, $R_C$, and which is also equal to the expansion ratio $R_E$. The following Table 1 illustrates minimum values of $AR_C$ satisfying the Inequality 1 for whole number compression ratios from 19 to 30.

TABLE 1

Minimum values of Atkinson Ratio and $AR_C$ for Internal Combustion Engines Having Compression Ratios, $R_C$, from 19 to 30 in Order to Obtain 60% or Greater Efficiency.

| $R_C$ | A | $AR_C$ |
|---|---|---|
| 19 | 2.284 | 43.4 |
| 20 | 2.062 | 41.2 |
| 21 | 1.887 | 39.6 |
| 22 | 1.755 | 38.6 |
| 23 | 1.648 | 37.9 |
| 24 | 1.559 | 37.4 |
| 25 | 1.483 | 37.1 |
| 26 | 1.417 | 36.8 |
| 27 | 1.358 | 36.7 |
| 28 | 1.306 | 36.6 |
| 29 | 1.259 | 36.5 |
| 30 | 1.216 | 36.5 |

Figure 2:
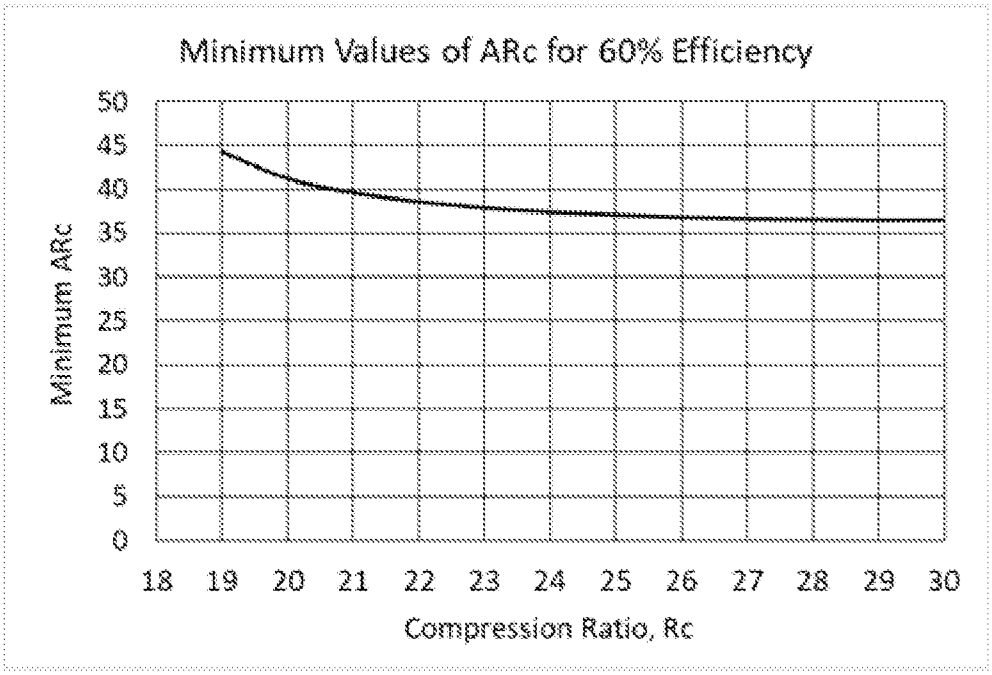
FIG. 2 is a graphical illustration of minimum values of $AR_C$ to obtain substantially 60% or higher brake efficiency for internal combustion engines of the present invention.

FIG. 2 illustrates the Inequality 1 and Table 1 in graphical form. One can see that the range of minimum values of $AR_C$ required to produce very efficient engines of near to 60% efficiency or more is a somewhat narrow band of values greater than 36, varying from about 36.5 to 43.4 for the particular design conditions of our work. Practical engines having $AR_C$ values according to the Inequality 1, which $AR_C$ values are generally greater than (or equal to) those shown in Table 1 and illustrated by the graph of FIG. 2, have not been known heretofore and may be regarded as falling within the scope of our invention.

Referring to FIG. 2, it can be seen that the efficiency level of 60% obtains substantially near a lower limit value of $AR_C$ approaching 36 for much of the range of compression ratios of practical importance. Therefore a simplification of the inequality formula for substantially 60% efficiency can be stated as:

$$AR_C = R_E \geq 36. \quad (2)$$

A whole number simplification of the narrow band range of preferred expansion ratios is between 36 and 44, inclusive, as shown in FIG. 2.

Although deviations in construction of a practical engine which do not quite satisfy the original inequality may result in an engine with slightly less efficiency than 60%, it will be apparent to those skilled in the art that such an engine would still be highly efficient, and would exceed the efficiency of any practical engines known heretofore. Therefore, it should be considered that any such engine making use of the features and theoretical principles in its design and construction as herein set forth falls within the scope of our invention, regardless of the actual efficiency. Moreover, any engine which substantially approaches the design constraints herein set forth also falls within the scope of our invention.

We will now describe example constructions of engines designed in accordance with the principles that have been presented. In doing so we will describe per example only one cylinder and its accompanying structure, but it will be appreciated by one skilled in the art that engines are commonly composed of multiples of such similar cylinders and parts, and such constructions are within the scope of our present invention.

Figure 3:
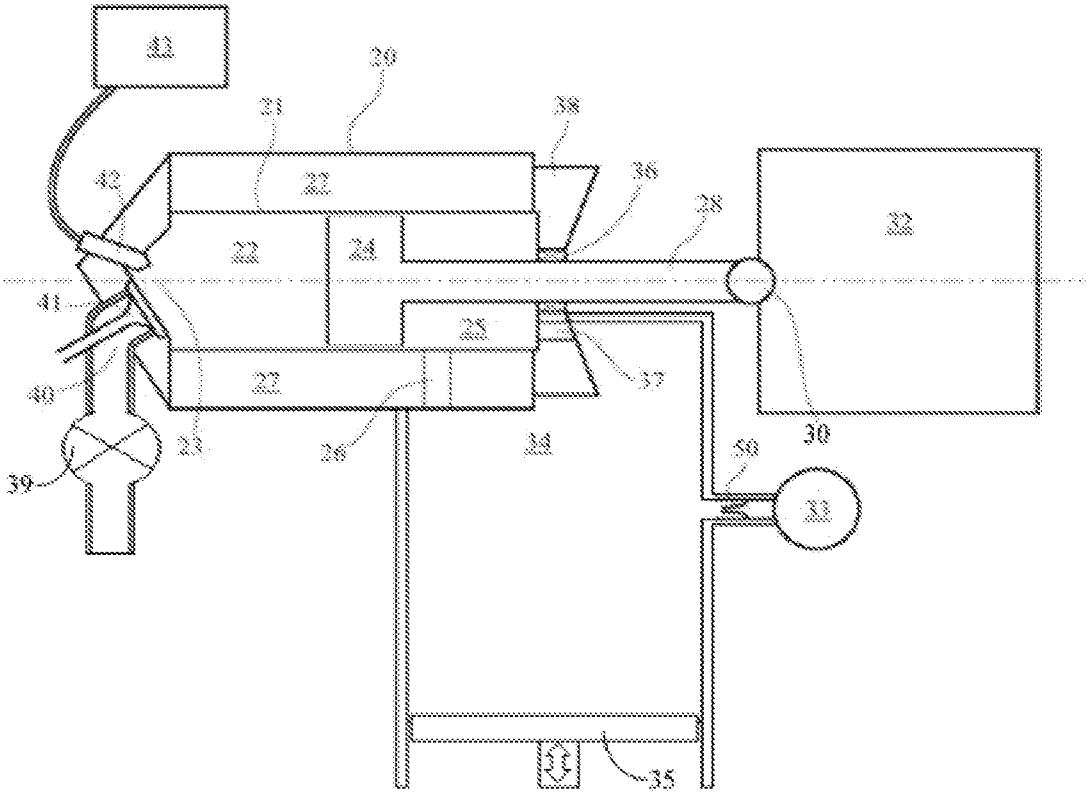
FIG. 3 shows a small engine (Example I.) having a piston with a shaft linkage connection between the piston and a power transfer means for conveying power into and out of the engine, which power transfer means may be, for example, a crankshaft or other device.

Example I. A First Example Engine Construction Having Backstroke Compression and a Shaft Linkage and/or Articulated Connection We will now show a preferred engine construction that uses piston motions to input a fluid or gas such as air into the engine, and to compress and expand the fluid or gas as performed in the General Cycle. This particular example is presented in FIG. 3. FIG. 3 shows a small engine having a piston with a shaft linkage and/or an articulated connection linkage between the piston and a crankshaft or other power transfer means for conveying power into and out of the engine. Referring now to FIG. 3, FIG. 3 shows an engine 20 with a cylinder. The engine 20 has an engine body 27 with a cylinder bore 21. Within the cylinder bore 21 are a cylinder volume 22 with an included combustion chamber portion 23 located in the normally closed portion of the cylinder, a piston 24 having a front side and a back side, and a back volume 25 located in the back portion of the cylinder. The front side of piston 24 faces toward cylinder volume 22 containing the compressible fluid, and the back side of the piston is toward the back portion of the cylinder. A fluid inlet means for admitting fluid into the cylinder volume, which may be an intake port 26 is placed in the wall of engine body 27 in a position to input gas working fluid such as air during the recharge portion of the engine cycle. The piston 24 is connected by a shaft 28 to a power linkage means 30 for conveying power between the shaft and a power transfer means 32. An example of the power linkage means 30 is a connecting rod which is attached to a crankshaft, as is well known in the art. In this embodiment, the connecting rod does not have a direct connection to the piston, but connects to shaft 28. The shaft 28 is maintained in axial alignment with piston 24 and cylinder bore 21 by a shaft bearing and seal 36 and bearing housing 38 positioned at the back end of the cylinder. This shaft is provided because the stroke-to-bore ratio is too great to facilitate a direct articulated connection of a connecting rod to the piston as is common in the art. Power transfer means 32 for conveying power into and out of the engine is representative of any such apparatus as is common in the art, such as a flywheel on a crankshaft, or an electrical generator or the like, or a linear electromagnetic device.

During the recharge portion at the end of each cycle and before the beginning of the next cycle, piston 24 is in a position outward from intake port 26 so that the intake port is in communication with cylinder volume 22. A fluid supply means for supplying working fluid to cylinder volume 22 is provided. As an example, a compressible working fluid, otherwise known as a compressible gas such as air is introduced into cylinder volume 22 through a fluid inlet means for admitting the fluid into the cylinder volume through, for example, intake port 26. This fluid or gas is obtained from a fluid supply 33. The fluid supply 33 may be at atmospheric pressure, or may serve to pressurize the fluid, as is common for example with a turbocharger. The fluid flows from fluid supply 33 to a reservoir 34, then through intake port 26 into the cylinder volume 22. Reservoir 34 is external of the cylinder and other engine components such as a crankcase. An optional check valve, such as a reed valve 50, may be placed between the fluid supply 33 and reservoir 34. This check valve can optionally serve to prevent fluid from flowing back toward the fluid supply 33 as the piston moves outward, reducing the back volume 25.

As the piston moves outward, fluid in the back volume 25 is forced out through intake port 26 and a back port 37. The back port 37, which provides for final discharge of fluid from the back volume 25, may be either situated in the end portion of the engine body 27 or adjacent to the shaft bearing 36 in bearing housing 38, as shown in FIG. 3. Shaft bearing 36 has a seal within it that prevents leakage of fluid from the back volume 25. Outward motion of the piston 24 may serve to add pressure to the fluid. However, reservoir 34 is sized so that the increase in pressure is not so great as to substantially rob power from the piston. Reservoir 34 preferably may be configured to be of variable size by the adjustment of a plunger 35. The variable size permits adjustable control of the amount of pressure increase in the reservoir. The increase in pressure in reservoir 34 from the rearward motion of the piston facilitates the flow of the fluid through intake port 26 when the piston is in its most outward position. However, if too much pressure is developed in the reservoir by the rearward motion of the piston, the power of the piston is negatively affected. The amount of power required to compress the fluid in the reservoir preferably is under 2% of the power conveyed by the piston, but in no case should the power required be more than 6% of the power conveyed by the piston. By making the reservoir variable in volume, and thus the pressure developed in the reservoir is also variable, the engine can be operated under various conditions, including affecting how thoroughly cylinder volume 22 is scavenged. In effect, one can set up conditions simulating exhaust gas recirculation (EGR) in a conventional engine.

Additional parts connected to the combustion chamber 23 are an exhaust port 40 with a valve 41, and an injection means for adding fuel to the compressed fluid, such as fuel injector 42. Port 40 with valve 41 form a closable opening to selectably permit transfer of the fluid out of the cylinder. The initial pressure, $P_1$, of the engine can be controlled by the inclusion of an exhaust flow pressure regulator 39 that regulates flow from the exhaust port. By maintaining pressure in cylinder volume 22 during scavenging, the operational characteristics of the engine may be selected. Pressure regulator 39 may be variable for selecting preferred operating conditions during engine use.

A heat input means for increasing the internal energy of the fluid in cylinder volume 22 is provided. In this embodiment the heat input means includes a fuel supply means for adding fuel to the fluid. As an example, this may be an injection means for transferring fuel into the cylinder volume, such as fuel injector 42 which receives fuel from a fuel supply system 43. This increases the internal energy of the fluid by combustion of the injected fuel. The heat input means may be controlled to add heat at a controlled rate, particularly both to raise the internal energy of the fluid to the desired peak pressure $P_3$, and to maintain that pressure for a controlled period of time.

The beginning of a cycle as defined here occurs at the time that the valve 41 is closed in the exhaust port 40 and the piston then begins to compress fluid in the cylinder volume 22. However, this does not occur at the time that the piston is near to the far outward position, called bottom dead center (BDC). Rather, the piston 24 moves inward from BDC with the exhaust valve 41 open until a position is reached where the cylinder volume 22 has been reduced by a factor of 1/A from the substantially greater value $V_5$ referred to above in describing the General Cycle and further described below. A is the Atkinson ratio. (In the present example, A has a value of 1.4 and the desired compression ratio is $R_C$=27.)

At the time that the valve 41 is fully closed, the value of cylinder volume 22 is $V_1$. All valves are closed and compression of the fluid, gas or air in the cylinder volume 22 begins as piston 24 continues to move inward toward top dead center (TDC) position, which is the point of least cylinder volume referred to as $V_2$ in the above General Cycle description. This least cylinder volume is substantially the volume of combustion chamber 23. As the piston 24 arrives at substantially the TDC position, heat $Q_1$ is selectably added to the fluid in the cylinder volume 22 (presently equal to the volume of combustion chamber 23) by the injection and burning of fuel as described by General Cycle Step II. This process continues for a short time, initially controlably raising the fluid to a desired maximum pressure $P_3$ and associated temperature $T_3$ at a near-constant-volume condition. For a brief additional time as the piston moves outward, heat $Q_2$ is controllably added as required and in a fashion to maintain substantially the constant pressure $P_3$, as described in Step III of the General Cycle. Then fuel cutoff occurs. At fuel cutoff, the cylinder volume 22 will have increased in volume to a value $V_4$ as described in the above General Cycle description. The heated gas, at a very substantial pressure, drives the piston farther thus sending power via the piston shaft 28, through power linkage means 30, and to the power transfer means 32. This continues until the piston reaches an outward position approaching BDC, at which point exhaust valve 41 opens to discharge burnt gases from the cylinder volume 22. At the effective time of valve 41 opening, the volume of cylinder volume 22 is substantially equal to $V_5$. Shortly after, the pressure in cylinder volume 22 falls below the pressure of the fluid in fluid reservoir 34. As the piston 24 continues to move outward, it uncovers intake port 26. Then a fresh charge of fluid displaces remaining burnt gases in the cylinder volume 22 and fills the cylinder volume 22 with a fresh charge of fluid. The initial pressure in cylinder volume 22, provided by the fresh charge of fluid, is the intake pressure, $P_1$. This pressure is controlled by exhaust pressure regulator 39. The replenishing of the cylinder volume 22 with fresh fluid continues for a length of time while the piston 24 completes its travel to BDC and where it then reverses direction, and covers the intake port 26 again by its inward motion. The valve 41 remains open for a further time as the piston continues to move inward. The valve 41 closes at the point where the cylinder volume 22 has returned to the value $V_1$. This is the point of beginning of a new cycle.

This two-stroke engine operating at an effective intake pressure $P_1$=115 kPa (1.15 bar) and having a compression ratio of $R_C$=27 has excellent fuel utilization for a broad range of renewable and fossil fuels. It gives good specific power (i.e., the power density in hp/liter) and substantially 60% brake efficiency or greater, depending on the fuel that is used. The engine has the following operating characteristics operating on No. 2 diesel fuel (ASTM D975-19a, 2-D (S-15) at 70% of stoichiometric mixture:

| | |
|---|---|
| Compression ratio, $R_C$ | 27 |
| Atkinson ratio, A | 1.40 |
| $AR_C$ | 37.8 |
| Intake pressure, $P_1$ | 115 kPa |
| Peak cylinder pressure | 21 MPa |
| Fuel ignition temperature at TDC | 1310 K |
| Brake efficiency | 60 % |

As an example, this small engine has dimensions of:

| | |
|---|---|
| Bore, B | 83 mm, |
| Stroke, S | 195 mm, |
| Stroke-to-Bore, S/B | 2.35 |

At 1200 RPM, a mean piston speed of 8.0 meters per second.

| | |
|---|---|
| Specific power | 24.0 hp per liter |

Other fuels are also being evaluated:

E10 gasoline (ASTM D4814-19, 10% ethanol)—efficiency is 60%

Fuel methanol (ASTM D5797, M100)—efficiency exceeds 60%

The above small engine shown in FIG. 3 as well as other internal combustion engines operating according to an optimized General Cycle operation and built according to the condition of Inequality 1 may operate at substantially 60% efficiency or better. Note that in this engine the $AR_C$ value of 1.4×27=37.8 is somewhat greater than the minimum $AR_C$ of Table 1. By using a higher value of $AR_C$, design conditions such as initial pressure and maximum cylinder pressure may be relaxed.

Fuel flexibility is an important benefit of our high-compression, high-efficiency engines. Except for changes in fuel injection means, the engine of FIG. 3 operates without modification on virtually any liquid or gaseous fuel. Some fuels such as methanol and methane are readily produced from renewable sources such as organic wastes. This is a significant benefit for prevention of global warming and climate change. We will now describe an especially preferred embodiment and set of design conditions for our engines that are well suited for construction of cogeneration units.

Figure 4:
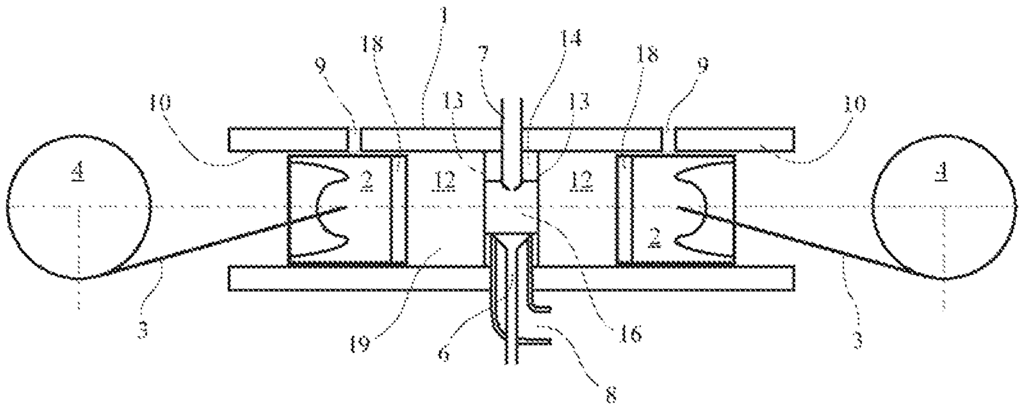
FIG. 4 presents an illustrative diagram for an opposed-piston engine (Example II.) that may be used for stationary cogeneration of electricity and heat or for transport applications.

Example II. A Second Example Preferred Engine Construction for Renewable Cogeneration of Electricity and Heat An especially preferred engine for cogeneration of heat and electric power, which operates generally in accordance with the General Cycle, and satisfies Inequality 1, is shown in FIG. 4. Referring now to FIG. 4, what is shown is a schematic diagram for a two-stroke, compression ignition, direct-injected opposed-piston engine. The engine has a substantially symmetrical construction regarding many of its parts; these duplicate parts are labeled with the same part number. Each mirrored half has practically the same construction and operation as in the previous engine example. The engine body 1 has two opposed substantially axially-aligned cylindrical bores 10 containing pistons 2 that move in opposition to each other. One pair of such opposed bores and their two pistons along with cooperating parts in an opposed piston construction are to be regarded as one cylinder, and an opposed-piston engine may have several such opposed-piston cylinders. The bores 10 and pistons 2 enclose two volumes 12. The two volumes 12 are separated from each other by a partition 14 positioned centrally between them. The partition 14 is formed of strong material capable of sustaining repeated high pressure and high temperature. The partition 14 contains a combustion chamber 16 which traverses the partition axially. A portion of the partition 14 containing combustion chamber 16 may optionally be made of a fracture-tough ceramic material. As shown in FIG. 4, partition 14 has axially opposite surfaces 13 that form end faces of the two cylindrical volumes 12. However, the volumes 12 are always in communication with each other through the connecting combustion chamber 16 which defines a third volume, and which passes through partition 14, and thus the two volumes 12 and the combustion chamber 16 volume work cooperatively as a single normally closed cylinder volume in the engine body 1. The combustion chamber is of transverse dimensions substantially smaller than the bore width, and the pistons therefore cannot enter into the combustion chamber. The width of the partition 14 and therefore the axial length of the combustion chamber 16 are preferably of a size that is substantially equal to the transverse dimension of the combustion chamber. The combustion chamber 16 is preferably cylindrical, but may be substantially spherical or cubic. This is so as to provide a combustion chamber with substantially the least surface area to contain the volume of the compressed fluid at the time of injection and/or ignition. The combustion chamber 16 is a single contiguous volume into which substantially all of the fluid is compressed when the pistons are at top dead center (TDC). The partition 14 is optionally composed primarily of a fracture-tough ceramic material such as a fine-grained zirconium dioxide material. Within the partition 14 are the combustion chamber 16 formed within the ceramic material, a fuel injector 7, and a closable opening forming an exhaust port with valve 6. As shown in FIG. 4, the partition 14 is constructed with sufficient axial width so as to accommodate the exhaust port with valve 6, and injector 7. The combustion chamber 16 may be formed with a flat side into which valve 6 seats. The width between surfaces 13 is also sufficient to allow the combustion chamber 16 to be of a square form factor which means to have axial and transverse dimensions of near equal values, as shown in FIG. 4.

An optional ceramic face 18 is applied to each of the pistons 2. This ceramic material is applied by plasma or flame spraying or other method and in a sufficient thickness to substantially reduce heat transfer from the hot gases to the piston bodies. The combination of the ceramic combustion chamber 16 and the ceramic piston faces 18 is an important optional aspect of our invention as it greatly reduces energy loss by heat transfer.

At the time that the valve 6 is fully closed, the total operating volume is the value of cylinder volume $V_1$. In the first portion of the engine cycle, the pistons 2 move toward the partition 14, approaching its surfaces 13 very closely as the pistons reach their top dead center (TDC) positions. In so doing, they compress a compressible fluid or gas 19 into the combustion chamber 16. This fluid 19 may comprise oxygen, air, combustible gas or vapor, or any combination of suitable gases. The TDC position is the point of least cylinder volume referred to as $V_2$ in the above General Cycle description. This least cylinder volume is substantially the volume of combustion chamber 16. Heat is introduced into the combustion chamber 16 by a heat input means configured to increase internal energy in the fluid by injection of fuel through fuel injector 7, which fuel almost immediately commences burning in cooperation with the compressed fluid 19, thus forming a combusted gas at high temperature and pressure. Heat $Q_1$ is selectably added to the fluid 19 in the cylinder volume (presently equal to the volume of combustion chamber 16) by the injection and burning of fuel as described by General Cycle Step II. This process continues for a short time, initially controlably raising the gas temperature and pressure to a desired maximum pressure $P_3$ and associated temperature $T_3$ at a near-constant-volume condition. (The volume of fluid 19 is nearly constant during the heat addition Q1 because this first heat addition occurs when the piston is near to TDC and it is moving very slowly.) For a brief additional time as the piston moves outward, heat $Q_2$ is controllably added as required and in a fashion to maintain substantially the constant pressure $P_3$, as described in Step III of the General Cycle. Then fuel cutoff occurs. At fuel cutoff, the cylinder volume will have increased in volume to a value $V_4$ as described in the above General Cycle description. In the next portion of the cycle, the pistons 2 move outward, transferring energy to crankshafts 4 by means of connecting rods 3. This is the power stroke of the engine. The two rotatable crankshafts are mounted in relation to the engine body, and the connecting rods or linkages between each crankshaft and its associated piston drive the pistons or extract energy from the movement of the pistons. The crankshafts are timed to advance the pistons at substantially the same time. The power stroke ends as the pistons 2 draw near to uncovering a fluid inlet means for admitting fluid into the cylinder volume, in the form of intake ports 9 in the walls of the engine body. The exhaust port with valve 6 opens at the end of the power stroke, and combusted gas is discharged from the cylinder volume. This cylinder volume is composed of combined volumes 12 and combustion chamber 16. The combusted gas is discharged through an exhaust manifold system 8. Shortly afterward, the pistons 2 pass outward sufficiently to uncover intake ports 9. While the pistons 2 are outward past the intake ports 9, fluid 19 enters through the intake ports 9 and displaces remaining burnt gases within the volumes 12 and combustion chamber 16. As the pistons 2 reach BDC, they reverse their direction of motion and begin to move inward again.

A third portion of the cycle comprises the operation of the engine between the time of beginning of inward motion of the pistons 2 and the time at which the engine again begins to compress fluid for a new cycle. During this time interval, the pistons move a substantial distance inward. The end of the interval is defined by the effective closure of the valve 6. A key aspect of our invention concerns the positions of pistons 2 and the total operating volume of the engine at the times of opening and closing of the valve 6. The total operating volume is equal to the volume of the combustion chamber 16 plus the combined volumes of the two volumes 12. This total operating volume will now be referred to simply as "V" with a designating subscript that indicates the value of V at a particular point in the engine's cycle. With reference to the P-V diagram of FIG. 1, at the time that the valve 6 closes, the volume of V is $V_1$. When the pistons reach TDC, the value of V is $V_2$, which is substantially equal to $V_3$. At the end of heat addition, the value of V is $V_4$, and at the end of the power stroke, which is at the effective time of opening of the valve 6, the value of V is $V_5$. In accordance with our invention, the various values of V satisfy the following conditions:

$$V_1/V_2=R_C$$

$$V_5/V_1=A$$

And $AR_C \geq 36.33+8788\ e^{-0.375\ Rc}$ as has been discussed in detail above.

This second preferred engine construction is considered to be of great value for use in distributed power generation. The engine is imagined to be coupled to one or more electric generators of any desired type. In addition, the waste energy is to be collected at available locations. Approximately 60% of the energy in the engine fuel will be delivered as work to the electrical generator(s). Of that work, as much as 96% to 98% may be converted to electrical energy. The waste energy comprises approximately 40% of the energy in the engine's fuel. A portion of that energy may be collected in the form of high-quality heat. The efficiency of collection and transfer of this heat may be in the general range of 75% to 80%. The heat is referred to as being of high quality because it can be collected at a very substantial temperature, in the general range of 100 degrees Celsius to as much as 300 degrees to 400 degrees Celsius. High-quality heat has great practical value for heating, producing hot water or steam, and for industrial process heat. Combining the two system efficiencies, the engine's efficiency of producing electrical power with the efficiency of collection and use of heat, provides an overall system efficiency of approximately 90%. In this fashion, our invention can be of immense value in reducing dependence on fossil fuels, or fuels of any kind. Our engines may use any of several suitable fuels such as natural gas or biomethane, dimethyl ether, methanol, diesel fuel, gasoline, or a combination of fuels. Some of these fuels may be obtained from renewable as well as geologic sources. Basic physical properties and design parameters of the above example engine are:

| | |
|---|---|
| Cylinder Bore | 7.126 in (0.181 m) |
| Piston stroke (each side) | 9.250 in (0.235 m) |
| Cylinder length | 38.4 in (0.976 m) |
| Cylinder displacement | 10.0 liters |
| Wall intake port each side | 1.825 in (0.0463 m) |
| RPM for synchronous generation | 900 rpm |
| Compression ratio | 25 |
| Atkinson ratio | 1.52 |
| $AR_C$ | 38 |
| Intake pressure | 120 kPa (1.20 bar, 17.4 psia) |
| Intake temperature | 360 k (188 deg. F.) |
| Maximum pressure | 22.0 MPa (3200 psia) |

As mentioned, our cogeneration engine described above can provide both heat and electricity with a combined efficiency of 90% or greater, and causes no net increase in atmospheric greenhouse gas (e.g., $CO_2$) in its operation when using a renewable fuel. This engine combined with a synchronous generator has a fuel consumption of approximately 0.148 kg/kWh when operating on ultra-low-sulfur diesel fuel. Electrical generation is at approximately 57% efficiency. Thus, our new engine technology represents a great advance toward reduction of global warming and climate change.

It is to be appreciated that the foregoing descriptions of engine configurations are only representative of the engines of our design. There are many parameters which are open to selection by an engine designer to accomplish the end goals needed for a particular application. Our designs and methods of operation are particularly focused on efficiency, and how to get maximum energy from the fuel expended. That is, to convert the most of the fuel possible into useful work, and besides, also to capture waste heat at a useful temperature.

Many elements of engine design are trade-offs. For instance, power and efficiency are commonly recognized as a trade-off. An engine having very high specific power will often have lower efficiency. Conversely, an engine having higher efficiency will often be thought of as having low specific power. Nevertheless, the efficiency of engines of our design is not solely due to sacrificing specific power. Following the principles laid out for engines of our design results in optimally efficient engines for a selected or desired power.

Our research confirms a longstanding belief in the art that greater efficiency of an engine is had by using a high compression ratio. But our research also shows that there are limits to what is practical. These limits depend on the peak pressures and temperatures involved.

The General Cycle likewise refers necessarily to a construction and operation that has an Atkinson ratio greater than 1. (Recall that the expansion ratio, $R_E$, is related to the compression ratio, $R_C$, and the Atkinson ratio, A, by the expression, $R_E$=A $R_C$. Thus, having an Atkinson ratio greater than one is equivalent to having $R_E>R_C$.) Our research also confirms a longstanding belief in the art that engines having Atkinson ratios greater than 1 can produce power at greater efficiency.

But our research also shows that there are practical limits to efficiency gains by employing the Atkinson ratio by itself. These limits depend on the compression ratio, fuel injection timing, friction and other energy losses, and specific power. These are reasons that an engine designer does not just use a high Atkinson ratio and expect a great increase in efficiency. Selection of the correct Atkinson ratio is a major subject of the present invention. There are physical limits which confine the design of engines. These include peak pressure, temperature, and specific power. They place limits to using increasing compression ratio and expansion ratio to gain efficiency.

There are also business reasons contrary to pushing the limits of efficiency. They relate to the costs of production and operation. Many of these considerations have to do with the intended use of the engine. Engines used in transportation are limited to lower weight and fitting into regular cubic form factors. They also need to have high specific power. Stationary power generation engines do not have such tight constraints, but still they must be within the limits of a cost/benefit ratio as given by fuel costs and operational costs as well as expenses for engine manufacture and installation or site costs.

All of these things, physical limits and business reasons, have bearing on whether or not a particular design is "practical." For the purposes of deciding which engines are practical, we establish reasonable limits of peak pressure, temperature and specific power, and compare them judiciously with increases in efficiency. Noting that efficiency does not always increase with increasing compression ratio and Atkinson ratio, but moreover that these are limited by reasonable upper limits of peak pressure and temperature, and declining specific power, we selected an efficiency goal of 60% to 65% brake efficiency and strove to define designs that would be practical and yet have high efficiency.

We also speak of the "optimum" or "optimal" efficiency engine. This does not necessarily mean the absolute highest efficiency, but rather the best efficiency one may achieve while maintaining certain other design goals such as a minimum requirement for specific power—that is, power per unit of weight or per unit of engine displacement.

There are always tradeoffs in engine design. It is well known in the art that there is a tradeoff between specific power and efficiency. One may at times get a higher engine efficiency by decreasing equivalence (the fraction of stoichiometric fuel added). But this lowers the power output (and the specific power). Efficiency can also be improved by using a higher compression ratio, but this is expected to lead to higher peak pressures and temperatures. Higher pressures require a stronger structure to contain them. Higher temperatures invoke more parasitic heat loss and create undesirable emissions. Another way of increasing efficiency is to design an engine which is over-expanded in the power stroke, that is, it has a high Atkinson ratio. Not only does this lead to a loss of specific power, but it also increases power losses due to the effect of friction from a longer stroke.

We have found that a lower limit of $AR_C$ (or $R_E$) (for obtaining 60% efficiency under practical conditions for a General Cycle engine) of just slightly over 36 is applicable to engines having compression ratios of approximately 26 to 30. Note that in the graph of FIG. 2 the line is becoming asymptotic. One can conclude from this that in higher compression engines (compression ratios of 26 to 30) optimal efficiency is obtained by over-expanding with an Atkinson ratio of about 1.2 to 1.4. It is impractical to use a higher expansion ratio than necessary; further efficiency gains are not justified in practical terms. At a point in increasing the Atkinson ratio, efficiency gains of higher Atkinson ratio become efficiency losses due to increased heat loss and friction. (This will be illustrated later with regard to FIGS. 5 to 7.)

On the lower end of our chosen spectrum of compression ratios, to meet the efficiency goal of 60%, the expansion ratio becomes impractically high, with a compression ratio of 19 requiring an expansion ratio of approximately 44. A compression ratio of 19 is found to be a practical lower limit for achieving an efficiency of 60%. Of course, most common engines operate at compression ratios well below 19, which is why they have no hope of having efficiencies anywhere near the above selected efficiency goal of 60%.

The great value of our engine design work is that with all of the unique features of the General Cycle, we have discovered that there is a definite paring of values of each compression ratio with a narrow band of corresponding values of $AR_C$ (which is equal to the expansion ratio, $R_E$) to obtain the overall optimal engine performance. It is not just that more Atkinson ratio is better, but rather that there is a specific range of values of Atkinson ratio and expansion ratio that result in high efficiency within the practical constraints of other conditions.

We establish a lower limit of values of the relationship of $R_C$ to $AR_C$ in order to achieve a target efficiency of 60% to 65% brake efficiency. This efficiency goal is reasonable, and has been suggested in the art as the theoretical upper expectation that may be possible for an internal combustion engine to achieve. However, engines in the prior art have not achieved an efficiency of 60% to 65%. It is well known that most actual internal combustion engines operate in the range of 20% to 40% efficiency. Large industrial engines and ship engines have the best efficiencies known to date, and they obtain 45% efficiency to the highest reported value of 55% efficiency. Thus, a goal of 60% efficiency or better is exceptional. The reason that we do not see commercial engines in the 60% efficiency range is that until the present invention they have not used the General Cycle with the unique paring of $R_C$ to $AR_C$ that we have developed.

Our unique application of the General Cycle is the use of two heat inputs in the manner described in combination with an optimum pairing of compression ratio with Atkinson ratio. This novel combination of design conditions creates a high-efficiency environment that has not been known in the prior art. This operating environment is key to the great benefits obtained by the practice of our invention.

We believe that a particular construction of parts is not necessary to practice our invention—rather, principles, features, and limits of engine design are defined. We have, however, described three example constructions. These constructions have those particular features which are useful in completing the goals of engine design according to our invention. The specifics of engine construction which are unique and which have utility in helping to achieve the operating characteristics of our invention will continue to be delineated. However, please note that this invention is not primarily a mechanical construction. Any assemblage of parts capable of performing the functions of the General Cycle and which includes our unique paring of $R_C$ and $R_E$ (or $AR_C$) is within the scope of our invention. Further, we note that the specified goal of 60% to 65% brake efficiency is not necessarily a requirement of our invention. The brake efficiency of an engine includes losses occurring through heat transfer and friction. These losses are subject to many physical construction parameters. It may well be that an engine gets better or worse brake efficiency depending on the specifics of construction and how those details affect energy loss such as caused by heat transfer and friction. Nevertheless, we believe that for any practical manner of engine construction, optimal efficiency shall be obtained for that construction by following the basic ratios and operations obtained by following the principles of our invention.

Figure 5:
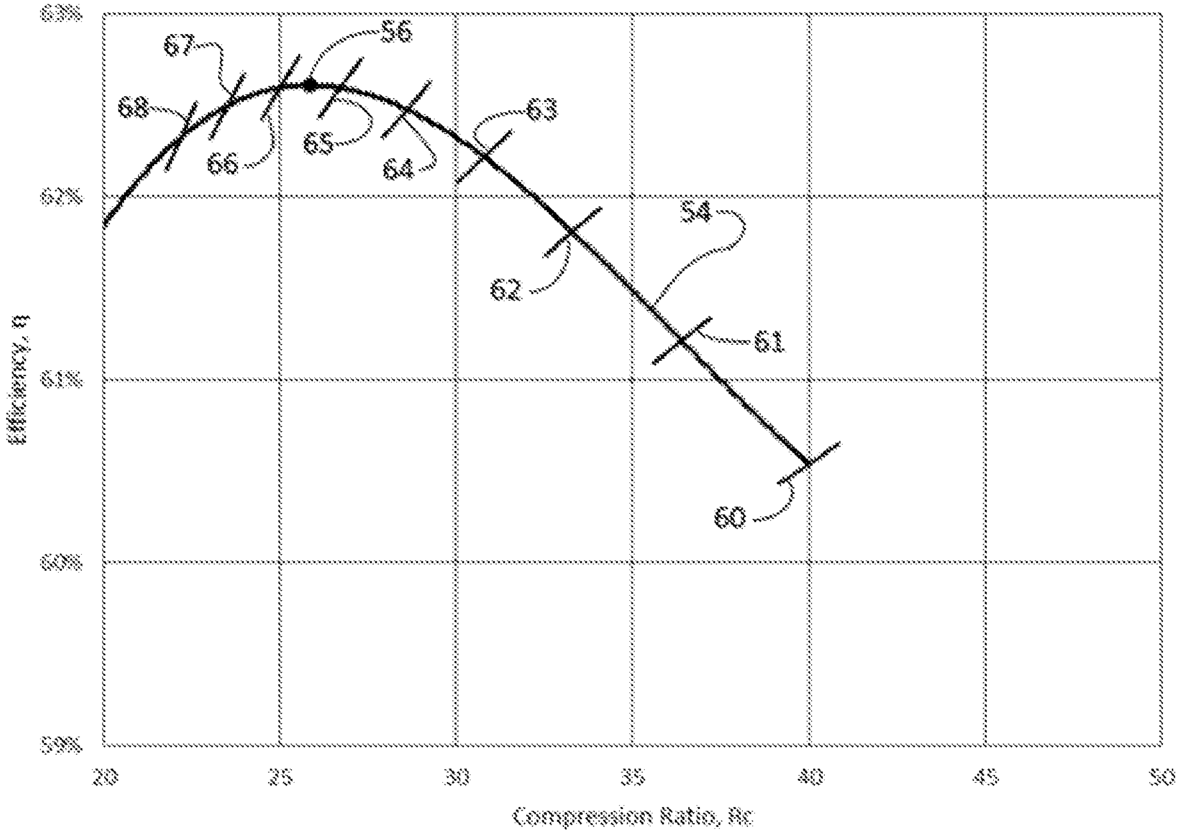
FIG. 5 is a plot of efficiency, $\eta$, versus compression ratio, $R_C$, for a particular engine of our design, as an example.

A Generalization of Our General Cycle Principles for Optimal Design of Engines Having Best Efficiency in Many Applications We will now show how the features and principles contained in our invention can be used effectively to construct engines having the best possible efficiency for a great variety of circumstances including engines having efficiencies both below and above 60 percent efficiency. FIG. 5 illustrates the plot of an efficiency curve or band 54 for the efficiency of a particular engine type conforming to the best principles of our invention. This plot compares efficiency, $\eta$, with varying values of compression ratio, $R_C$. Shown is a particular band of a single value of expansion ratio, $AR_C$ or in other words $R_E$, being in this example an $R_E$ of 40. For any point on the line, the values of efficiency, $\eta$, compression ratio, $R_C$, and expansion ratio, $R_E$, are defined. But also note that this curve is for a particular engine size, construction, piston speed, maximum pressure, fuel type and equivalence. Of particular note is that this curve displays a peak value of efficiency identified as point 56 on the curve. That peak efficiency occurs at a particular value of $R_C$ for this type of engine with an expansion ratio of 40. The conclusion is that for a particular expansion ratio, there is a singular value of compression ratio that produces the best value of efficiency. Our research shows that the shape of this curve is predictable and universal in nature. Within the parameters of our types of engine designs, for whatever values of engine size, construction, piston speed, maximum pressure, fuel type, or equivalence, the shape of the curve is similar, and it has a peak value of efficiency. Nevertheless, while the shape is similar, the position of the curve on the graph is variable and depends upon the previously mentioned parameters as well as others.

FIG. 5 also shows the positions on the curve that represent values of Atkinson ratio. The crossing Line 60 represents an Atkinson ratio of 1.0. Notice that line 60 intersects curve 54 at a compression ratio of 40. Since curve 54 is for an $R_E$ of 40, and $R_C$ is 40, the Atkinson ratio, $A=R_E/R_C$, is 1.0. Note also that curve 54 does not extend beyond an $R_C$ of 40. It is not within the realm of our engines, nor is it common among any type of internal combustion engines to have an Atkinson ratio substantially below 1.0. Line 61 represents an Atkinson ratio of 1.1. Line 62 represents an Atkinson ratio of 1.2. Line 63 represents an Atkinson ratio of 1.3. Line 64 represents an Atkinson ratio of 1.4. Line 65 represents an Atkinson ratio of 1.5. Line 66 represents an Atkinson ratio of 1.6. Line 67 represents an Atkinson ratio of 1.7. Line 68 represents an Atkinson ratio of 1.8. The Atkinson ratio increases as one moves left along the efficiency curve in the plot. The peak value 56 of the efficiency curve 54 for an $R_E$ of 40 is between an Atkinson ratio of 1.5 and 1.6, for this particular engine example.

Starting at an Atkinson ratio of 1.0, as one moves left along the constant $R_E$ line 54, one encounters lower compression ratios, $R_C$, higher Atkinson ratios, and higher efficiency. But increasing efficiency only exists up to a point, reaching a peak value at 56. Then, moving further left, lower compression ratios and higher Atkinson ratios do not enjoy the benefits of greater efficiency, but rather, efficiency decreases.

The stroke length of an engine increases in a definite way with increasing expansion ratio, $R_E$. (Remember from the description of the General Cycle that the expansion stroke begins at point 2 and ends at point 5. These points correspond to cylinder volumes $V_2$ and $V_5$, and the expansion ratio is defined as $R_E=V_5/V_2$. Thus we see that the expansion ratio contains the stroke length in its definition.) FIG. 5 illustrates how, for the first time, we can specify that for an engine of a particular configuration and having certain properties, and having a certain bore and overall stroke length, which is indicative of physical size, that we can determine the optimum compression ratio, and thus the Atkinson ratio, in order to achieve the peak of efficiency.

Figure 6:
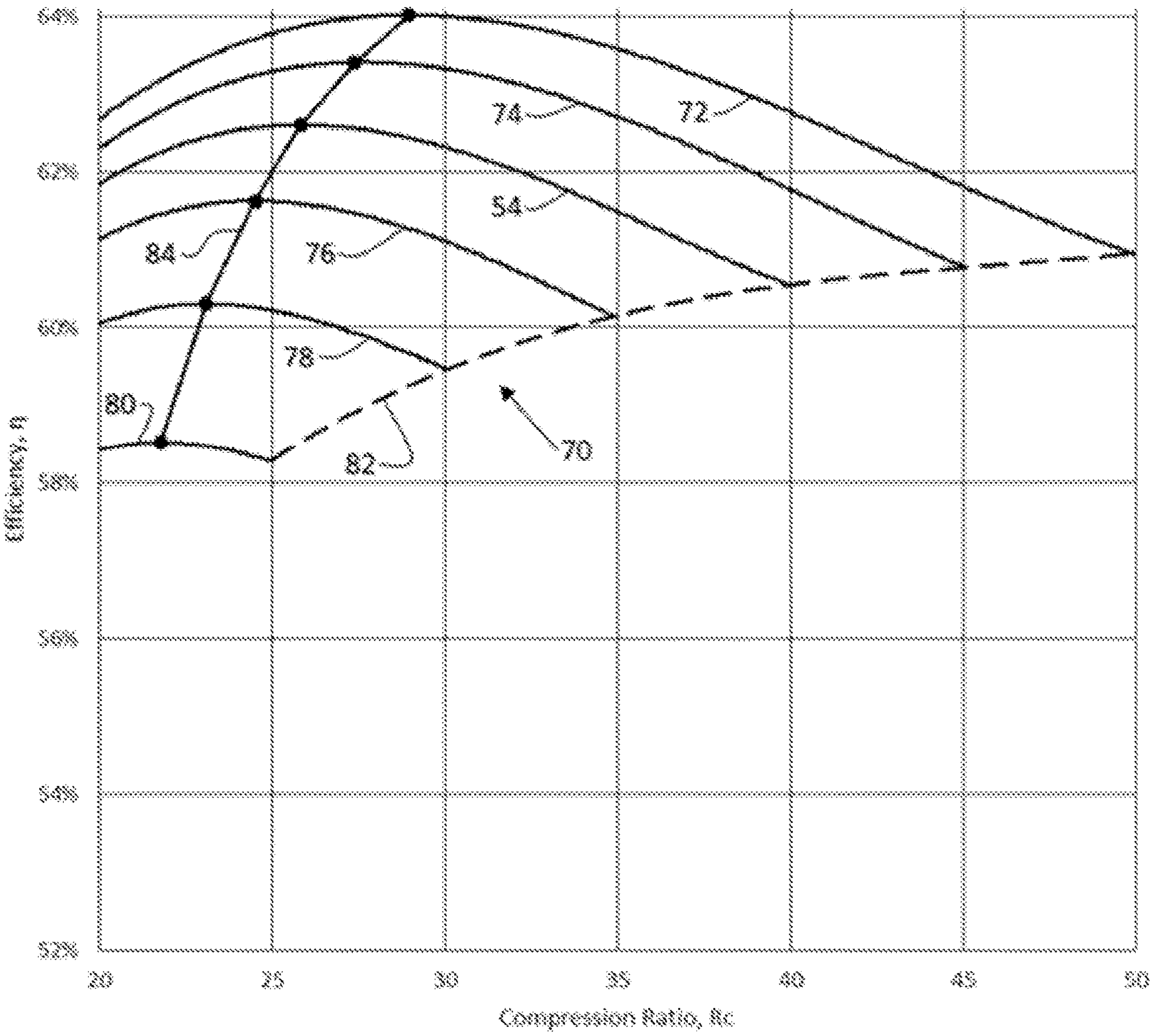
FIG. 6 is a plot of efficiency, $\eta$, versus compression ratio, $R_C$, showing several bands of efficiency corresponding to several levels of selected expansion ratio, $R_E$.

FIG. 6 is a plot having the same axes as in FIG. 5, and expands on the example by illustrating multiple bands of values, each corresponding to a particular value of expansion ratio, $R_E$. The highest band 72 of values is for an expansion ratio $R_E$ of 50, and progressing downwardly, band 74 represents an $R_E$ of 45, band 54 represents an $R_E$ of 40, band 76 represents an $R_E$ of 35, band 78 represents an $R_E$ of 30, and band 80 represents an $R_E$ of 25. On this graph, for comparison purposes all parameters other than the expansion ratio (and thus the stroke) and the compression ratio are held constant. The plot of the engine efficiency curve or band 54 for an $R_E$ of 40 is the very same curve as is illustrated in FIG. 5. Note that generally an increase of expansion ratio produces an increase of efficiency, but that there are points on each band where the efficiency is lower than the peak values of adjacent bands. Dashed line 82 represents an Atkinson ratio of 1.0, and by definition, each of the bands of efficiency terminates at the $R_C$ value corresponding to the same band $R_E$ value. For each band there is a peak value of efficiency. These peak values represent the best efficiency for the particular expansion ratio. These peak values are connected by a line. We refer to this as a ridgeline 84. Points on the ridgeline, even points that are between $R_E$ bands, represent the best efficiency obtainable for the particular engine parameters, and at varying values of expansion ratio. We refer to this group of efficiency bands and the corresponding ridgeline, generally as an engine efficiency family 70. Note that all engine parameters other than the compression ratio and the expansion ratio (and thus the stroke) are held constant across the engine efficiency family.

Figure 7:
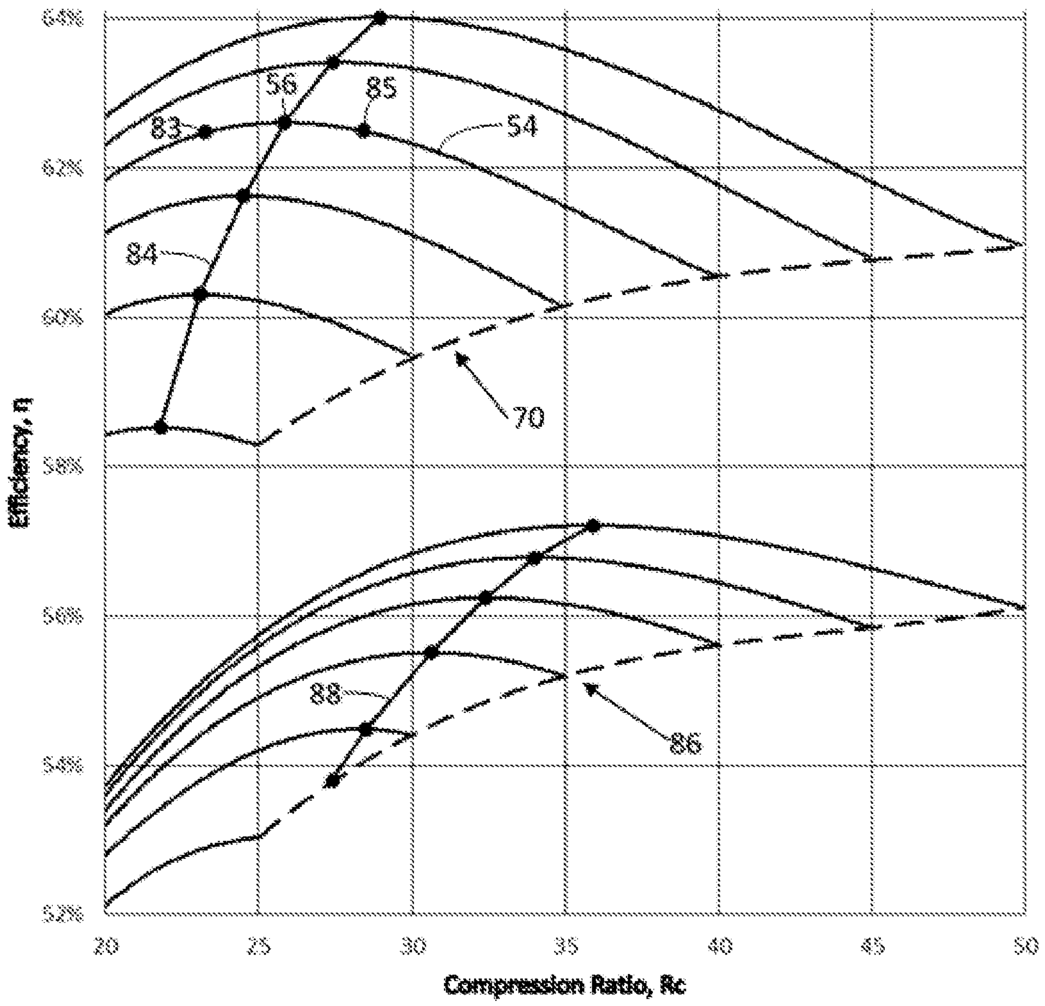
FIG. 7 is a graph of efficiency, $\eta$, versus compression ratio, $R_C$, showing multiple groups or families of efficiency bands, representative of different engine types and engine parameters.

FIG. 7 illustrates a plot having the same axis definitions as in FIG. 5 and FIG. 6, and further expands on the example by showing two sets of curves. Reproduced from FIG. 6 is the engine efficiency family denoted as 70. A second engine efficiency family 86 which has different design parameters is also shown. Both of these efficiency families are shown on a single graph. It then becomes apparent that there can be widely varying efficiencies depending on engine parameters. These sets of curves are created by varying one or more of the several engine parameters of engine size, construction, piston speed, maximum pressure, fuel type, or equivalence. Of particular importance is the parameter of engine size. On the upper portion of the graph in FIG. 7 is a set of bands for engine efficiency family 70 which corresponds to a large engine, on the order of one that would be used for a megawatt generator or for a ship engine. It has a large-engine ridgeline 84. On the lower portion of the graph is a set of bands for engine efficiency family 86 corresponding to a small engine, on the order of one that would be used for a small residential generator or the like. It has a small-engine ridgeline 88. Both sets of bands represent expansion ratio bands such as the bands 25, 30, 35, 40, 45 and 50 of FIG. 6, as previously described. They group together in the same manner as illustrated in FIG. 6. But the end results in terms of compression ratio and its relationship to efficiency are quite different. Note that the only engine parameter changed between these two examples is engine size, in terms of bore diameter. Other changes in engine parameters will also produce changes in the location of the bands and ridgelines within the graph. However, all such examples fall within the scope of our invention wherein their constructions are in accordance with the principles we have presented. All are accomplishing the goal of determining the optimum efficiency of an engine given its design constraints and intended use.

Since for each point in each of the bands, including the ridgeline value of peak efficiency, we know the compression ratio, $R_C$, and the expansion ratio, $R_E$, thus we also know the Atkinson ratio, A. For the first time, we have discovered not only that there is in fact an optimum Atkinson ratio, but also what that optimum Atkinson ratio is for each ridgeline $R_E$-$R_C$ pair.

Now the optimum Atkinson ratio does vary, as has been shown, based upon a host of engine design parameters. The peak efficiencies vary, and may occur both above and below the before mentioned efficiency goal of 60% or more. Nevertheless, we have demonstrated how to design an engine having optimum efficiency for its size and other design conditions. Note that for most efficiency bands, the peak efficiency for a given expansion ratio, $R_E$, is found to be at an Atkinson ratio greater than 1.0. The exception is in engine efficiency family 86, at the bottom band, which represents an $R_E$ of 25. For this selected engine type, at this expansion ratio, the most efficient engine is at an Atkinson ratio of 1.0. The small-engine-ridgeline 88 impinges on the A=1.0 dashed line between the expansion ratios of 25 and 30.

Before continuing on to explore applications of the information presented in FIGS. 5, 6, and 7, a further observation may be noted. Referring now to the upper graph of FIG. 7 for a large engine system, we wish to focus attention on the area of the maximum efficiency (ridgeline) point in the fourth band from the bottom, point 56, and nearby points 83 and 85. This band, shown as band 54, displays the domain of engine efficiencies that may be achieved in a representative large engine design of our construction for which the expansion ratio, $R_E$, has a value of 40 and compression ratios, $R_C$, range from 20 to 40. The peak efficiency was found to be 62.63% at point 56, at a compression ratio of $R_C$=25.6. Points 83 and 85 are placed 10% to either side of this best compression ratio, at points 83 and 85. The point 83 to the left of point 81 is at a compression ratio of $R_C$=23.0 and the efficiency at this point is found to be 62.49%. Similarly the point 85 to the right has a compression ratio of $R_C$=28.2 and the efficiency there is equal to 62.53%. The loss of efficiency realized by a ten percent deviation from the ridgeline is found in this case to be approximately 0.2%. From this, we recognize that small deviations of a design compression ratio from the ridgeline value may be an acceptable application of the ridgeline data, and the engine designer may find an advantage in choosing such a small deviation from the optimal compression ratio for his particular engine design.

We have shown that the principles of our invention have wide application for many types and purposes of engine design. Therefore, we will now show how selection of the expansion ratio with its associated best "ridgeline value" of compression ratio may be utilized to obtain an optimal engine construction for practically any desired application, and we will then present an example engine design illustrating this design method. Table II shows a range of optimal (ridgeline) pairs of expansion ratio $R_E$ and compression ratio $R_C$, over the ranges of greatest value and interest, with expansion ratios ranging from $R_E$=25 to $R_E$=50, and we will show how varying of the $R_E$-$R_C$ pair influences the properties of an engine whose other features are held constant.

TABLE II

Sample Optimum (Ridgeline) Engine Designs for a Moderate Size Engine. (Bore = 0.187 m, 7.36 in) $R_E$ = 25 to 50. Engines having higher expansion ratios obtain greater efficiency but at the expense of declining power output compared to engine size.

| Compression Ratio Rc | Expansion Ratio Re | Engine Speed RPM | Stroke (each side) Millimeters | Brake Efficiency $\eta$ | Power Kilowatts | Maximum Gas Temp. T4 (deg K) | Specific Power kW/liter |
|---|---|---|---|---|---|---|---|
| 22.75 | 25 | 1178.98 | 181 | 57.06% | 262.43 | 3036.8 | 34.1 |
| 24.18 | 30 | 1020.77 | 209 | 58.76% | 248.66 | 3022.9 | 26.9 |
| 25.7 | 35 | 900.00 | 237 | 60.00% | 237.93 | 3010.2 | 22.1 |
| 27.15 | 40 | 804.78 | 265 | 60.93% | 228.25 | 3000.1 | 18.5 |
| 28.6 | 45 | 727.78 | 293 | 61.64% | 219.98 | 2991.5 | 15.9 |
| 30.1 | 50 | 664.23 | 321 | 62.19% | 213.20 | 2984.0 | 13.8 |

Figure 8:
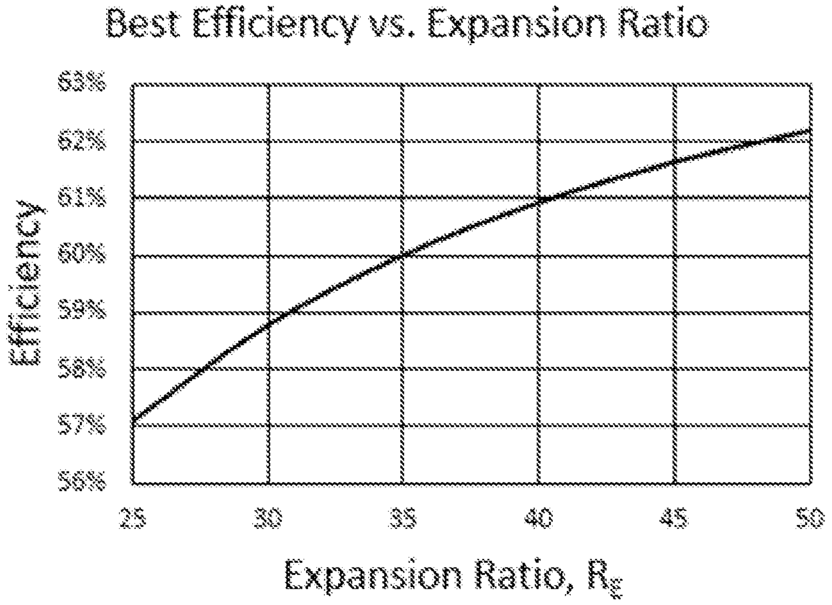
FIG. 8 shows a relationship between expansion ratio, $R_E$, and efficiency for a particular class of engines of optimal design having best compression ratios, $R_C$.
Figure 9:
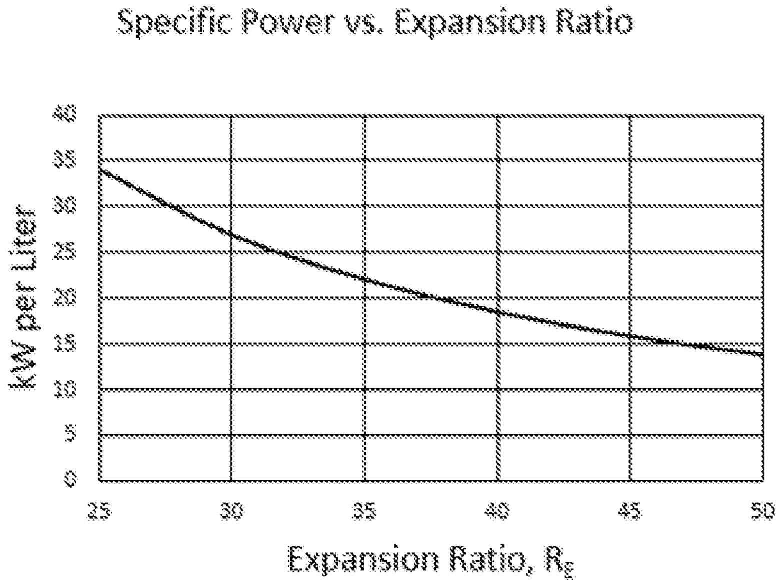
FIG. 9 shows the relationship between expansion ratio, $R_E$, and specific power for a particular class of engines of optimal design having best compression ratios, $R_C$.

Referring now to Table II, the table presents performance characteristics of one particular engine construction (a very efficient opposed piston, two-stroke engine of substantial size, bore B=187 mm, adhering to our design principles) for which the optimal pair of expansion and compression ratios is varied while the cylinder bore, the combustion chamber size and configuration, and many other engine properties, remain constant. We see from the second and fifth columns of the table that increasing the expansion ratio results in higher engine efficiency. This relationship between $R_E$ and efficiency is plotted in FIG. 8. And, we see in the fourth column that increasing the expansion ratio causes a lengthening of the stroke, and this in turn causes a slowing of engine speed, shown in the third column of the table. This means that an engine with a higher expansion ratio must be larger to perform with near to equal energy output. For this case with cylinder bore and combustion chamber size held constant, there is found a decline in energy output, shown in the sixth column of the table. If this energy output is divided by the engine size (we used cylinder displacement) then you have a measure of the power-to-size ratio, or specific power, of the engine. This engine figure of merit is given in the right-most column of Table II. We see that an increase in expansion ratio causes a decrease of specific power. This is shown graphically in FIG. 9. From this, we conclude that obtaining a higher efficiency results in a heavier and more costly engine even in the very best engine designs, and one may rightly ask, "Which combination of efficiency and specific power is best?" The answer is it depends on the application, and the designer must make the "best choice" for his need.

Figure 10:
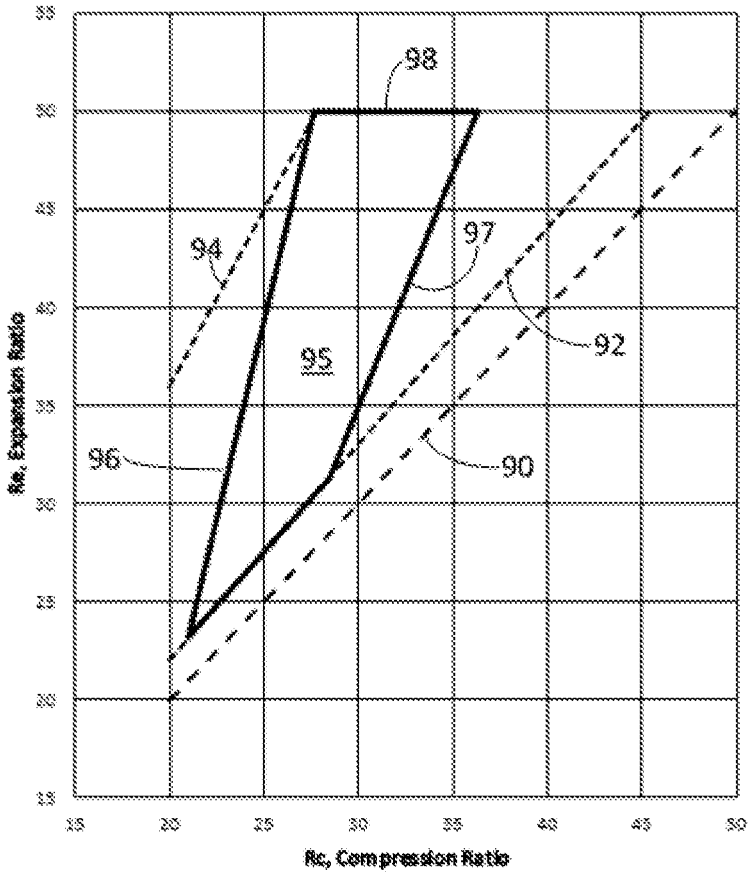
FIG. 10 is a map of the range of lines of $R_E$-$R_C$ pairs yielding best efficiency for engines of our design, representative of different engine types and engine parameters.

In FIG. 10 we show a plot of the range of optimum compression ratios, $R_C$, each of which in combination with its paired expansion ratio, $R_E$, provides the highest efficiency for the given expansion ratio, $R_E$. FIG. 10 has coordinate scales sized to show a range of compression ratios between 20 and 50. It also shows a range of expansion ratios from 20 to 50. Line 90 is a "diagonal line" comprising points of equal $R_C$ and $R_E$. The Atkinson ratio along this line is A=1.0. This is the line along which most common engines operate, including Otto cycle engines and Diesel cycle engines. Note, however, that most common engines have a compression ratio less than 20, and so they would not appear on the graph. Also shown on the graph is line 92 of points for an Atkinson ratio of 1.1. Similarly, an Atkinson ratio of 1.8 is shown, denoted as line 94. Why these particular Atkinson ratios are chosen will become apparent below.

A large-engine ridgeline 96 is plotted on this graph for an engine having a cylinder bore dimension of 13 inches (0.330 m) and having $R_C$ values even lower comparable to those of $R_C$ as used in FIG. 7. (A larger engine equates to lower optimum $R_C$ values on the engine ridgeline, as demonstrated in FIG. 7.) In constructing the $R_E$ versus $R_C$ graph of FIG. 10, these ridgeline values were found to form a substantially straight line. A small-engine ridgeline 97 is also plotted in FIG. 10 for an engine having a cylinder bore of 3 inches (0.0762 m). It too becomes a substantially straight line when presented on a $R_E$-$R_C$ plot. We have found several ridgelines representing other engine parameters, some having been described in FIGS. 5 through 7 above. The two ridgelines for the 3-inch and 13-inch cylinder bore engines occupy the limits of engine sizes that we have undertaken to study. As could be expected, engines of intermediate size have been found to have optimal $R_E$-$R_C$ pairs that fall between the left and right straight-line boundaries shown in FIG. 10. We also believe there is a practical limit to the benefits of increasing expansion ratio. This is suggested by FIG. 9 which shows that specific power is greatly diminished at high values of expansion ratio, $R_E$. Therefore we have chosen to limit preferred engine designs to expansion ratios of 50 or less. This limit on $R_E$ is indicated by line 98.

Of particular note is that the Atkinson ratio increases as one moves left (or counter-clockwise) from the diagonal A=1.0 line 90. Thus, the ridgelines (line 96 and line 97 and all such lines between, not shown) only contain points for Atkinson ratios greater than or equal to one. At their lower ends, ridgeline values impinge on an Atkinson ratio of A=1.0. Our preferred engines are ones that achieve higher efficiencies than these by utilizing Atkinson ratios of between 1.1 and 1.8. Further, they are engine designs that will generally fall within the enclosed space 95 of the graph of FIG. 10, that space being bounded on the right side by line 97, bounded on the left by line 96, bounded along its lower edge by line 92 representing A=1.1, and bounded at the top by line 98 for which $RR_E$=50. However, as mentioned above, we note that a small deviation from the optimal value of compression ratio may be chosen by the engine designer, up to a ten percent deviation or more above or below the ridgeline value without causing a substantial loss of engine efficiency.

We caution that while FIGS. 5 through 10 are highly instructive for understanding of the purposes and limitations of our invention, it was necessary in their presentation to hold a great many design variables constant in order to illustrate the principles being presented. If a change is made for any design variable other than the three that were investigated in the graphs of FIGS. 5 through 10 (engine size indicated by the bore, $R_E$, and $R_C$) then appropriate adjustments become necessary to obtain the exact numbers. Properties of the gas working fluid in the engine are of special importance in optimizing an engine design. Two gas properties of particular interest, the gas inlet pressure and temperature, will now be brought into our design by an analytical process in the next paragraph.

We will now show that an optimum value of compression ratio, falling generally within the preferred bounded area of FIG. 10 but extending the application further, can be found by means of a simple formula. The following equation can be used to determine optimum compression ratio, with substantial accuracy, for engines of our invention over the range of engine properties represented by FIGS. 5 through 10, and which also allows for variation of the gas inlet conditions:

$$R_C = 0.3395\frac{(T_1/P_1)^{1.594}}{B^{0.363}}R_E + 15.36 \tag{3}$$

Where $R_C$ is the compression ratio providing maximum efficiency $T_1$ is the inlet temperature in Kelvin degrees $P_1$ is the inlet pressure in kilopascals (100 kPa=1 bar)

B is the cylinder bore diameter, ranging in value from 76 mm to 330 mm.

and $R_E$ is a selected expansion ratio for an application, provided that $R_E \geq 1.10\ R_C$.

The map shown in FIG. 10 includes within its bounds the range of $R_E$-$R_C$ pairs for a great many engine designs. Then the actual value of the optimum compression ratio for a design may be computed by use of Equation 3, and this will provide the maximum efficiency in engines of our design. As was explained earlier by use of FIG. 7, minor deviations from the optimum $R_E$-$R_C$ pairs as defined by Equation 3 and by the limits of FIG. 10 cause only very small reductions in engine efficiency. Skilled application of minor deviations from the optimal values as defined by Equation 3 and FIG. 10 may have great value in the practical construction of engines adhering to our design principles and thus should be regarded as falling within the scope of our invention.

This formula produces $R_C$ and $R_E$ pair values closely corresponding to ridgeline values in the area we have studied. Thus, for an engine of particular engine parameters of size, construction, piston speed, maximum pressure, fuel type, and equivalence, one can use this Equation 3 to predict the ridgeline pairs of $R_C$ and $R_E$ as conditions are varied.

Consider that the object of the present invention is to teach methods for design of engines of exceptionally high efficiency for many applications. To this point in our description, we have defined the optimum $R_E$-$R_C$ pairs for obtaining generally the best possible efficiency for any engine built according to the principles and methods of our invention. Of course there will be many applications for which the best and most practical design for the application may include small deviations from the optimum $R_E$-$R_C$ pairs as have been defined. In referring to the details of FIG. 7 above, it was shown that small deviations from the computed optimum $R_C$ value for the $R_E$=40 band of the large engine efficiency family 70 produced substantially negligible reductions in efficiency. As was shown in this case, a deviation of 10 percent from the ridgeline value of $R_C$ resulted in only a 0.2% loss of efficiency, which would usually be regarded as an insignificant reduction of efficiency. This pattern of efficiency variation is observed to extend across the entire range of applications for the present invention. We will therefore define the range of application of our invention to include small allowed variations from the optimum values as have been described. Then a mathematical expression for compression ratios $R_C$ generally falling within the scope our invention may be expressed by using an inequality, $(1-\varepsilon)X \le R_C \le (1+\varepsilon)X$, wherein ε is a small fraction such as 0.1, and X has the value, $$X = 0.3995\frac{(T_1/P_1)^{1.594}}{B^{0.363}}R_E + 15.36.$$

The maximum compression ratio included within the enclosed space 95 of FIG. 10 is $R_C$=36.3. Similarly, a compression ratio, $R_C$, of up to 36 covers the bounds of the small-engine-ridgeline of FIG. 7. At $R_C$ values less than 26.5, the small engine ridgeline boundary 97 of FIG. 10 impinges the line A=1.0. However, of more practical interest are large engines of the type which would be used for large scale stationary electrical generation, or for ship propulsion, where the increased weight resulting from lower specific power is of minimal concern, while efficiency of fuel use may be of primary concern. Moreover, with these types of applications there also becomes increased utility in using high-quality waste heat. As shown, these engines work best in a higher Atkinson ratio range, some as high as A=1.8.

The ridgeline of the large engine shown in the upper plot in FIG. 7 demonstrates that there is utility in efficiencies lower than 60%, because those efficiencies are nonetheless very good, and that the peak values, the ridgeline values, can be obtained at relatively lower compression ratios and expansion ratios. Therefore, expansion ratios below the originally specified value of 36 are a viable option. For very large bore engines, our initial research indicates that a compression ratio of 20, an expansion ratio of 22, and an Atkinson ratio of 1.1 produces a good efficiency that is acceptable for large power generation engines.

Applications of the General Cycle with Limitations on Gas Temperatures

It may be necessary to modify the General Cycle operation in some situations for the purpose of limiting NOx formation. This may be accomplished by controlling gas temperature as well as flame temperature in the cylinder. Flame temperature can be controlled by fuel selection and optional additives, operating at lower equivalence, and premixing some of the fuel with the air input. An inherent characteristic of our invention in all of its aspects is that the heat input $Q_2$ is controllably added so as regulate chamber pressure. In the General Cycle mode of control, the heat input is regulated to maintain a constant pressure up until the time of fuel cutoff. This is a very practical method of control that can achieve the highest possible efficiency of an engine. On the other hand, the mode of control of heat $Q_2$ input may be selected to be in any way desired by the engine operator, and in some circumstances it may be desired to extend the period of heat input to some degree. This will always result in a loss of efficiency. A specific method for lowering of the bulk gas temperature is by dividing the fuel input into three parts, including a third portion of heat being added at constant temperature, as described below—this will lower efficiency and thus would only be used where a lower peak gas temperature is required.

Figure 11:
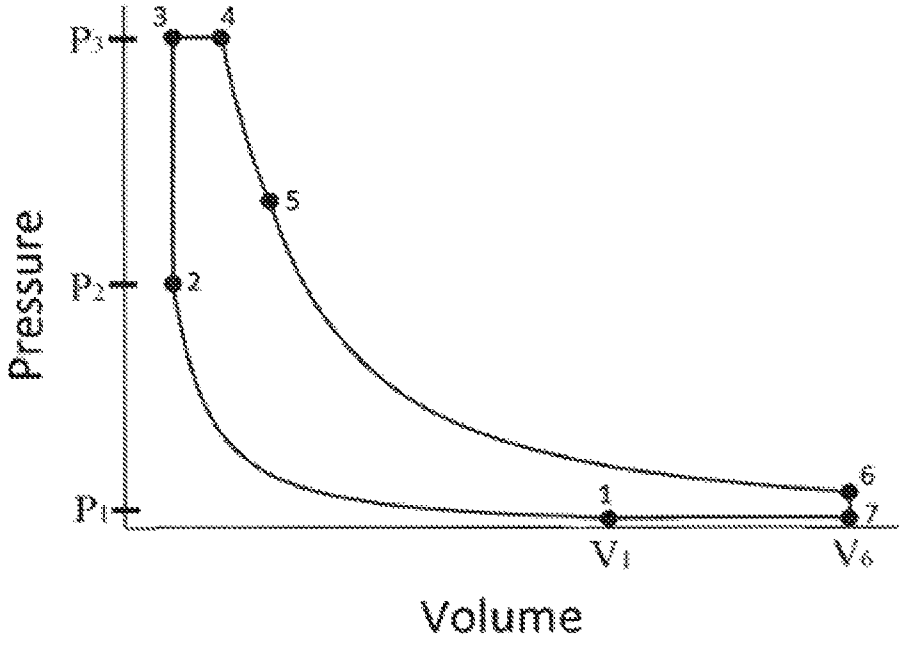
FIG. 11 is a P-V diagram of the Temperature-limited General Cycle.

FIG. 11 is a P-V plot of the Temperature-limited General Cycle. This reversible thermodynamic cycle is an extension of the General Cycle in which the heat input $Q_2$ is divided into two parts, a heat input $Q_2$ at controlled constant pressure, which ends when a specified gas temperature is reached, and a subsequent heat input $Q_3$ which is controllably applied at constant temperature. Any of our General Cycle engines can operate according to this controlled-temperature cycle merely by a change in the fuel injection control program.

Referring to FIG. 11, the Temperature-limited General Cycle has the following steps—

I. Adiabatic compression from 1 to 2
II. Addition of heat $Q_1$ at constant volume from 2 to 3
III. Addition of heat $Q_2$ at constant pressure from 3 to 4
IV. Addition of heat Q3 at constant temperature from 4 to 5
V. Adiabatic expansion from 5 to 6
VI. Lowering of pressure from 6 to 7 at constant volume
VII. Lowering of temperature from 7 to 1 at constant pressure, which returns the gas to volume $V_1$, the point of beginning.

The above reversible processes and their associated perfect gas relationships provide sufficient information to derive an equation for ideal efficiency of an engine having both limited pressure and limited temperature. With suitable substitutions of variables, the following equation for efficiency is obtained. All variables in the equation are dimensionless:

$$\eta = 1 - \frac{\alpha\beta^{\gamma}(\delta/A)^{\gamma-1} + A\gamma - A - \gamma}{[\alpha(\gamma-1)\beta\ \ln\ \delta + \alpha(\beta-1)\gamma + \alpha - 1]R_C^{\gamma-1}}$$

Where η is the ideal efficiency expressed as a dimensionless fraction,

α is the pressure ratio, defined as $\alpha=P_3/P_2$
β is the $Q_2$ cutoff ratio, $\beta=V_4/V_3$
$\gamma=C_P/C_V$ is the specific heat ratio.
δ is the $Q_3$ cutoff ratio, $\delta=V_5/V_4$
A is the Atkinson ratio, $A=V_7/V_1$ and $V_7/V_6$
$R_C$ is the compression ratio, $R_C=V_1/V_2$ In this equation, as in the General Cycle equation presented earlier, γ is taken to be a "constant" specific heat ratio. Assigning a value, γ=1.35 is often found to give excellent results for a real engine.

While the above Temperature-limited General Cycle is presented as a reversible, closed cycle operating on a polyatomic ideal gas, we have found that the equation may be profitably applied to analysis of real engines by recognizing that Steps VI and VII may be considered to be replaced by steps that exchange exhaust products for a fresh charge of air or other suitable working fluid. The calculated efficiency may then be adjusted to account for energy losses in the real engine being modeled.

In our research we have determined that the use of the General Cycle is critical in obtaining peak values of efficiency as we have described. In particular, the General Cycle has two heat inputs. (Or three heat inputs as in the case of the Temperature-limited General Cycle.) The first heat input is at substantially constant volume, raising the pressure to a maximum value. The second heat input follows the first heat input as the volume starts to increase, and continues until fuel cut-off. The limitation on how much heat (or fuel) can be added in total is the stoichiometric fuel value modified by the equivalence. This specifies the total amount of fuel that can be added, and thus the amount of heat produced. In our research we have found that the highest efficiencies are obtained by the second heat input (including all heat inputs after the first heat input) being at least 20 percent or greater of the total heat input. For this 20 percent figure, we consider all heat added after the first heat input to be counted in the second heat input, whether or not a constant pressure is maintained. The value of 20 percent or greater of the total value for the second (including any remaining heat inputs) is universally applicable in our engine designs in obtaining the optimum efficiency.

In some cases, it may be advantageous to design an engine with a somewhat lower efficiency than 60% in order to have a lower engine cost. This approach to engine design will be illustrated by our third engine example, described below

Figure 12:
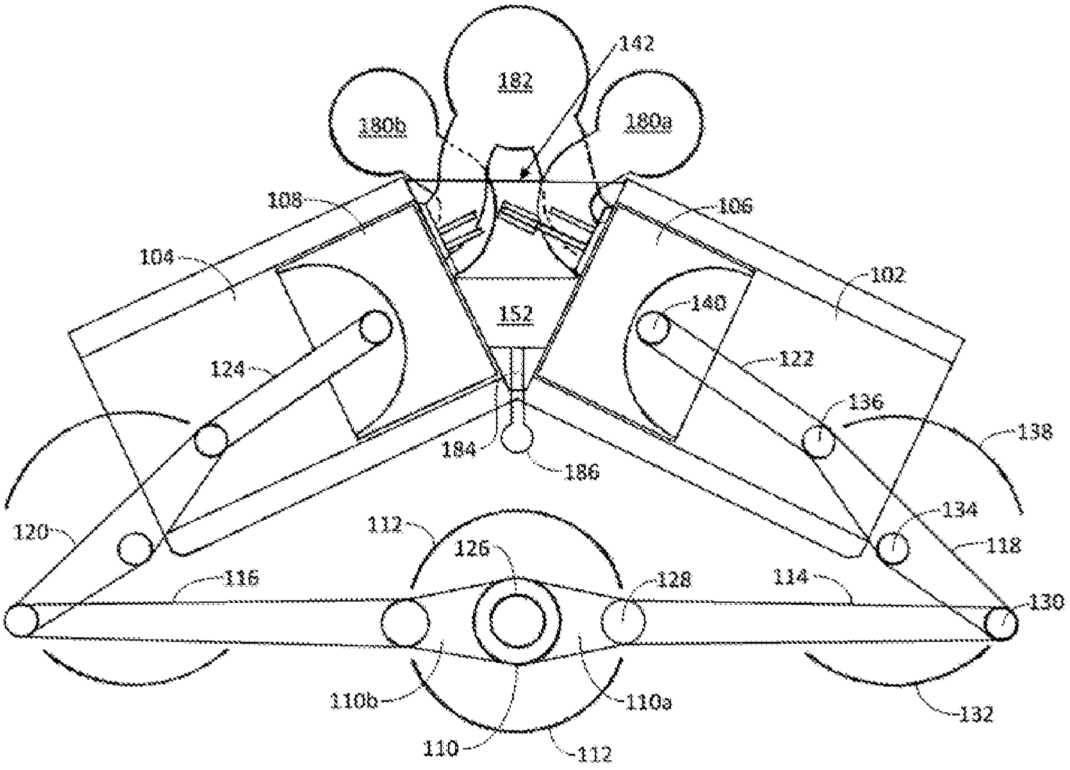
FIG. 12 is a side view for a four-stroke engine (Example III.) for mobile applications that is representative of such engines which may be constructed while adhering to the principles of optimal efficiency design according to the present invention.

Example III. A Four-Stroke Engine Construction for Heavy Duty Mobile Applications A third physical embodiment of our invention is shown in FIGS. 12 through 15. This may best be described as an opposed piston, single crankshaft, four-stroke engine. It is presented to show particular features of our invention, and how those features may be used to support four-stroke functionality. Referring to FIG. 12, this is an end view of the third embodiment of our engine, showing a schematic diagram of the engine body with opposed pistons at substantially top-dead-center position. A cylinder bore 102 is shown on one side and a cylinder bore 104 is shown on the other side. These two cylinder bores are interconnected by a combustion chamber 152 within a partition, as will be described, with a working fluid comprising a gas within the enclosed space made up of the volumes of the two cylinder bores and the combustion chamber, the contained working fluid being shared by the assembly of parts containing the two cylinders and the combustion chamber as though they were a single cylinder. A piston 106 is slideably mounted in cylinder bore 102 and a corresponding piston 108 is slideably mounted in cylinder bore 104. These two pistons are driven together by an assembly including a single crankshaft 110 having arms 110*a* and 110*b*. These arms rotate circularly along arcs shown at 112. Connecting rods 114 and 116 are mounted on the crankshaft. The connecting rods operate levers 118 and 120. The levers in turn operate piston linkages 122 and 124, which drive pistons 106 and 108.

It will be appreciated by one skilled in the art that in order for crankshaft 110 to rotate that crankshaft arms 110*a* and 110*b* must be in different planes, as viewed from the end view in this diagram. Accordingly, we have chosen our convention to be that crankshaft arm 110*a*, connecting rod 114, lever 118, piston linkage 122, piston 106, and cylinder bore 102 are in a foreground plane. Crankshaft arm 110*b*, connecting rod 116, lever 120, piston linkage 124, piston 108 and cylinder bore 104 are relatively in a background plane. This offset distance is sufficient for crankshaft arms 110*a* and 110*b* to rotate about a main journal 126 of the crankshaft in a conventional manner, but to have an overlap in the front ends of the cylinder bores, as will be described.

Crankshaft arm 110*a* supports crankpin 128, upon which connecting rod 114 pivots. Connecting rod 114 is in turn connected by a bearing 130 to lever 118. The lever pivots about a pivot point 134 which is mounted to the frame of the engine so that as the connecting rod moves it actuates the lever to move along an arc as shown at 132. The other end of the lever moves in a corresponding arc 138. This end of the lever is connected by a bearing 136 to piston linkage 122, which is in turn connected to piston 106 by wrist pin 140. Thus, as the crankshaft rotates it drives piston 106 back and forth in cylinder bore 102. On the other side of the engine the parts are similarly connected by joints so that the crankshaft synchronously moves piston 108 back and forth in cylinder bore 104.

As the crankshaft rotates, pistons 106 and 108 are driven to top dead center at substantially the same time, as is shown in FIG. 12. Similarly, as the crankshaft rotates another half rotation, the pistons are driven to bottom dead center, both at substantially the same time. It will be appreciated by one skilled in the art that the rotation-based path of the two pistons is different between the top-dead-center and the bottom-dead-center positions, but that the construction is designed so that the pistons are both at top dead center and at bottom dead center at the same times.

This construction being of a four-stroke design, one can appreciate that there are four parts of the cycle: intake, compression, power, and exhaust. The two pistons 106 and 108 work together in unison to achieve these four strokes, acting on the working fluid in unison. Therefore, the assembly may be considered to be one single cylinder from the point of view of the working fluid. It should be noted that it is common in the art for actual engines to be composed of multiple cylinders. The same is true of this design, and although only one functional cylinder (the complete assembly of parts holding the working fluid) is shown and described, more cylinders may be arranged along the crankshaft, and they would be timed so that the power strokes would provide even power to the crankshaft.

Now it was noted that the present design has cylinder bores that are offset and are partially overlapped in their front end positions. This is unlike common opposed piston engines in which two pistons are aligned in a single straight bore. There are actually two geometric differences in this design compared to common opposed piston engines. Firstly, in this embodiment, the cylinder bores are not aligned in one straight bore, but rather have their front faces offset on the opposite sides of the interposed partition. This offset is in the direction substantially parallel to the axis of the crankshaft. Geometrically, a projection of the cylinder bores overlap, but the cylinder bores themselves do not touch because they are separated by the partition. Secondly, in this embodiment, the cylinder bores are tilted at an angle with respect to each other. Both of these geometric differences facilitate the connection of the crankshaft to the pistons. This makes possible a relatively compact opposed piston engine with a single crankshaft. The impetus of the inherent compactness of a single crankshaft leads to the present geometry, which may be desirable in certain applications.

Figure 13:
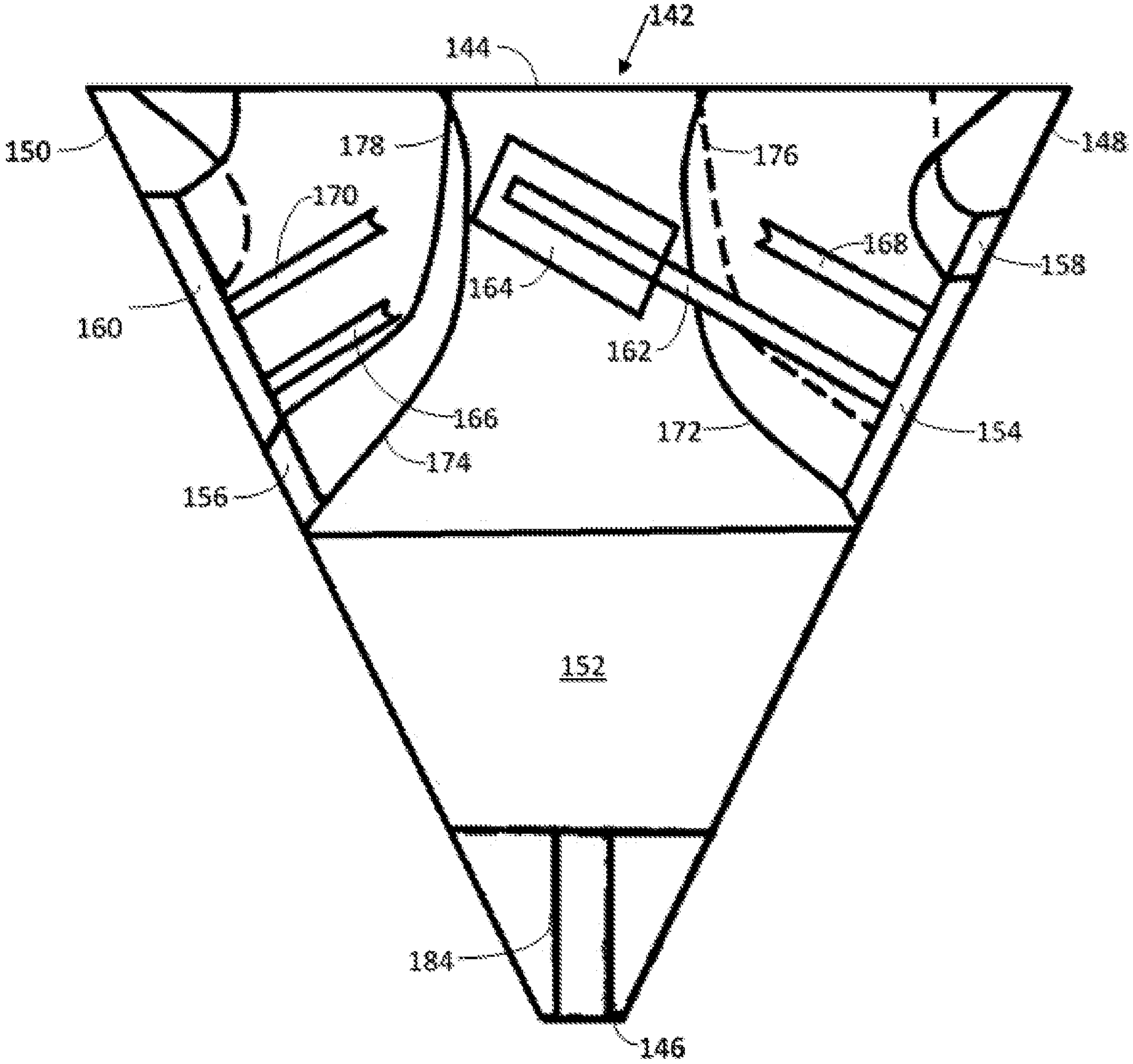
FIG. 13 is an enlarged end view of the wedge-shaped partition shown in the engine of FIG. 12.

Now continuing with a description of the parts of the engine, between the front ends of the two cylinder bores is a partition, denoted generally at 142. The partition is preferably made of steel, except for an optional ceramic chamber portion. FIG. 13 shows an enlarged depiction of the partition, which is generally of a wedge shape, and in this end view can be seen to have a top 144 and a bottom 146 and two sloped sides, side 148 facing the front end of cylinder bore 102, and side 150 facing the front end of cylinder bore 104. Within the partition is an opening therethrough which forms a combustion chamber 152. It can be seen in FIG. 12 that the pistons 106 and 108 approach the partition very closely when they are in their top dead center positions. This drives nearly all of the working fluid in the cylinder bores into the combustion chamber as the pistons approach top-dead-center at the end of the compression stroke.

FIG. 13 further shows that the partition contains valves to facilitate the four-stroke operation. Valve 154 is an intake valve controlling flow of working fluid into cylinder bore 102. Valve 156 is an intake valve controlling flow of working fluid into cylinder bore 104. Valve 158 is an exhaust valve controlling the flow of exhaust from cylinder bore 102 during the exhaust stroke of the engine. From this view, exhaust valve 158 is nearly hidden behind intake valve 154. Valve 160 is an exhaust valve controlling the flow of exhaust from cylinder bore 104. From this view, intake valve 156 is nearly hidden behind exhaust valve 160. Valve stem 162 connects to valve 154. Valve guide and actuator 164 schematically represent means for controlling valve 154. This may preferably be an electronically controlled hydraulic or pneumatic actuation mechanism. Valve stem 166 connects to intake valve 156. Valve stem 168 connects to exhaust valve 158. Valve stem 170 connects to exhaust valve 160. Each of these valves has a separate valve guide and actuator similar to valve guide and actuator 164, which are not shown for reasons of clarity of the drawing. Working fluid passing into the engine during the intake stroke passes though intake headers 172 and 174. Exhaust exiting the engine during the exhaust stroke passes through exhaust headers 176 and 178. The intake headers connect to intake manifolds 180*a* and 180*b*, (FIG. 12), which are interconnected and provide the source of fresh working fluid. The exhaust headers connect to exhaust manifold 182. The exhaust manifold and the intake manifold may be mechanically connected by a turbocharger unit (not shown) in a manner well known in the art.

FIGS. 12 and 13 further show an injector port 184 in the partition, through which a fuel is injected into the combustion chamber. The injector is connected to a fuel source 186.

Figure 14:
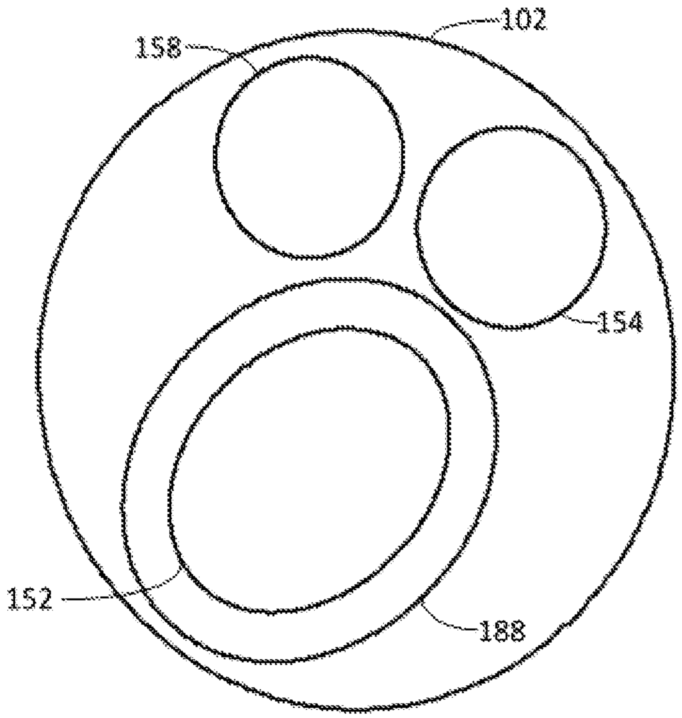
FIG. 14 is a schematic view from the partition side, looking squarely toward the top end of the right cylinder bore, at the interface of the cylinder bore and the partition.

FIG. 14 is a schematic view of the partition side 148 facing cylinder bore 102 as if one were looking squarely at the end of the cylinder bore from the partition, to better show relative positions of the components. The outside circle represents the edge of cylinder bore 102. Valve 154 is the intake valve. Valve 158 is the exhaust valve. Combustion chamber 152 is formed within the partition 142. This feature is shown in FIG. 14. The partition 142 is made of a strong material capable of sustaining repeated high pressure and high temperature, such as steel, and placed within the partition is the chamber which may comprise a ceramic insert 188 in order to better confine the heat of the burning fuel mixture. The combustion chamber as shown is preferably of a circular-cylindrical form, but presents an oval surface as it intersects the partition's surface at an angle.

Figure 15:
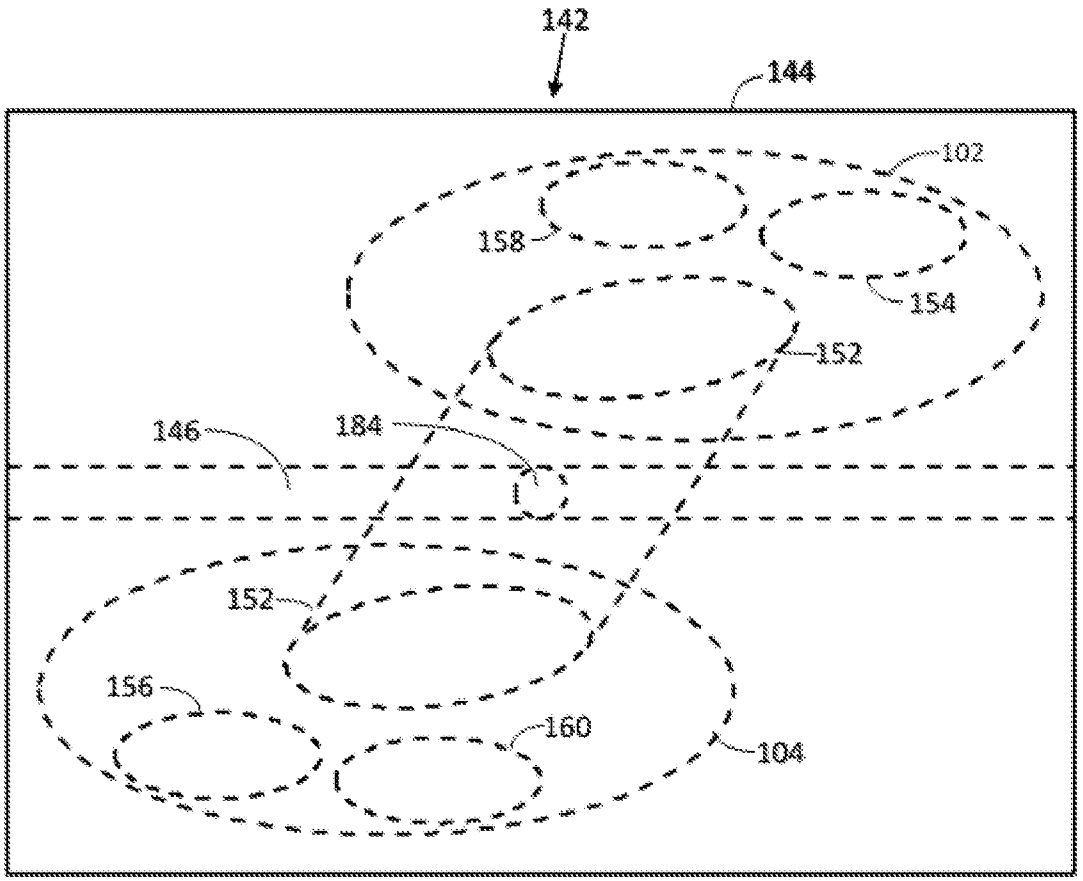
FIG. 15 is a top view of the partition in schematic form showing only the valve openings and the combustion chamber within the lower portion of the partition.

FIG. 15 is a top view of the partition 142 showing schematically only the openings within the lower surfaces of the partition. The top of the partition is shown at 144. In this view it is easy to see that cylinder bores 102 and 104 are offset. Combustion chamber 152 is slanted within the partition to more effectively communicate between the cylinder bores. Intake valves 154 and 156 are depicted as the outermost valves, while exhaust valves 158 and 160 are the innermost valves. It can be seen that each valve has sufficient clearance for its associated valve guide and actuator to operate in-line with it. The bottom of the wedge shape partition is shown at 146. The injector port is shown at 184.

It is apparent that the partition is the functional unit that allows the alignment of the offset cylinder bores to be possible, and yet to provide for open communication through the combustion chamber between the cylinder bores. It further allows for the cylinder bores to be tilted at an angle to each other.

The engine of this embodiment is contemplated to be used as a large vehicle engine, such as a truck engine or an off-road equipment engine. It would presumably have three or more cylinders of the type described. The four-stroke operation is as follows:

The intake stroke begins as pistons 106 and 108 begin to pull away from the top-dead-center position. As soon as there is clearance, intake valves 154 and 156 open to allow an inflow of fresh working fluid into cylinder bores 102 and 104. The intake of fresh working fluid continues throughout the outward movement of the pistons. In keeping with the Atkinson-type function of our engines, the intake valves do not close at bottom-dead-center. Instead, the intake valves remain open for a period of time as the pistons reverse direction and move forwardly from the bottom-dead-center position. Depending on the engine speed, intake pressure and the valve size, this means that the cylinders may continue to fill past bottom-dead-center, or alternatively they may force a portion of the fresh charge of working fluid back into the intake manifold.

At a selected position during the inward movement of the pistons, intake valves 154 and 156 close. This begins the functional compression stroke of the engine. As the pistons reach top-dead-center position, the working fluid is substantially compressed into combustion chamber 152. Because the pistons approach partition 142 very closely at their top-dead-center positions, substantially all of the compressed fluid is then contained in the combustion chamber. In this top dead center position of the pistons, the pistons effectively block communication between the combustion chamber and the valves, which are not located within the combustion chamber.

At this point injector 184 begins injecting fuel into the compressed working fluid. The injection of fuel is controlled to first increase the pressure of the working fluid to a maximum pressure, and then, as the pistons begin to move outwardly, the injection of fuel is controlled to maintain a constant pressure and/or a desired temperature, for a period of time. Then fuel cutoff occurs.

The power stroke of the engine continues as the pressurized working fluid drives the pistons 106 and 108 outwardly, imparting power to the crankshaft 110. Since the location of the pistons at the beginning of compression is inward from bottom-dead-center, and the power stroke continues through the full stroke, this creates the condition for an Atkinson ratio of a selected amount to be employed in this engine.

As bottom-dead center is again reached, exhaust valves 158 and 160 open, and then as the pistons 106 and 108 move inwardly, they drive the exhaust out of cylinder bores 102 and 104. The exhaust valves stay open until the pistons approach partition 142, and then the valves must close to allow the pistons to complete their inward movement. This completes the four-stroke cycle, and the engine is now in the position to begin the intake again.

It will be observed that the combustion chamber 152 is not emptied of exhaust, because the pistons do not sweep the combustion chamber in partition 142. This is actually not functionally different than common four-stroke engines, which have an area of the cylinder into which the piston does not enter, and thus exhaust gasses within the volume of the combustion chamber remain in the cylinder at the end of the exhaust stroke. Thus, an equal or greater amount of residual exhaust gas is left in prior art four-stroke engines also.

This example of the third embodiment of our engine shows that engines of four-stroke design are also suitable for construction after the manner of our engines, and that they may benefit from increased efficiency by employing the same principles as we have previously explained.

A further important construction benefit that is made apparent from this example is that the partition between the front ends of the cylinder bores, which houses the combustion chamber, serves the purpose of connecting the two halves of the opposed piston cylinder, even if the opposing cylinder bores are offset, or unaligned. This is important considering that the offset of the opposed cylinder bore pair is a requirement for their making connection to a single crankshaft. Further, the partition makes possible that the opposing cylinder bores can be angled, or tilted, with respect to each other. Angling the cylinder bores would be far more difficult in prior art opposed piston engines that lack a partition since it would create a space into which the pistons could not travel, and that this space would be a larger volume than any reasonable combustion chamber. Thus, the utility of a partition in opposed piston engines of our design is further emphasized.

As in our first two engine examples, this third engine is particularly well suited for use of a renewable fuel. As this engine is intended for mobile applications, a liquid renewable fuel would be preferred. Suitable fuels include dimethyl ether, methanol, renewable diesel, or a combination of fuels. Some basic physical properties and performance characteristics are presented below for this engine when operating on pressurized liquid dimethyl ether (DME). The engine as described below has three "opposed-piston" cylinders, each cylinder having two offset and angled opposed cylinder bores, two pistons and a wedge-shaped partition containing four valves and a combustion chamber extending through it.

| | |
|---|---|
| Brake efficiency at 1200 rpm | 57.2% |
| Power at 1200 rpm | 500 kW (670 hp) |
| Torque at 1200 rpm | 3967 N-m (2926 lb-ft) |
| Specific power | 17.9 kW/liter (24 hp/l) |
| Cylinder bore diameter | 6.77 in (0.172 m) |
| Piston stroke (each side) | 7.60 in (0.193 m) |
| Engine width/cylinder length | 41 in (1.04 m) |
| Engine displacement | 53 liters |
| Compression ratio | 22 |
| Atkinson ratio | 1.364 |
| $AR_C$/Expansion ratio | 30 |
| Intake pressure | 135 kPa (1.35 bar, 19.6 psia) |
| Intake temperature | 318 K (113 deg. F) |
| Maximum pressure | 22.0 MPa (3200 psia) |

We have now described our invention, including our three representative examples of construction. We again emphasize that the invention is primarily centered in the concepts and principles of efficient engine design, and not in mechanical constructions. We thus set forth the following claims.

What is claimed is:

1. An internal combustion engine operating generally in accordance with a thermodynamic cycle called the General Cycle, comprising:

a cylinder;

a compressible fluid within one portion of the cylinder;

a piston mounted to slide within the cylinder to alternatingly compress and expand the fluid;

a heat input means configured to increase the internal energy of the fluid by combustion of an injected fuel, the heat input means increasing the heat of the compressible fluid in two heat inputs, a first heat input raising the pressure at substantially constant volume, and a second heat input added at substantially constant pressure;

at least one closeable opening within the cylinder to permit transfer of the fluid into or out of the cylinder;

a power transfer means in communication with the piston configured to move the piston or to extract energy from the movement of the piston;

the fluid alternatingly being compressed by a ratio of compression denoted as Rc, and being expanded by a ratio of expansion denoted as $R_E$, and the Atkinson ratio being denoted as A and defined as $A=R_E/R_C$;

the ratio of compression being between 20 and 36;

the ratio of expansion being between 22 and 50; and the Atkinson ratio being between 1.1 and 1.8.

2. An internal combustion engine operating generally in accordance with a thermodynamic cycle called the General Cycle, comprising:

a cylinder;

a compressible fluid within one portion of the cylinder;

a piston mounted to slide within the cylinder to alternatingly compress and expand the fluid;

a heat input means configured to increase internal energy of the fluid by combustion of an injected fuel, the heat input means increasing the heat of the compressible fluid in two heat inputs, a first heat input raising the pressure at substantially constant volume, and a second heat input added at substantially constant pressure;

at least one closeable opening within the cylinder to permit transfer of the fluid into or out of the cylinder;

a power transfer means in communication with the piston configured to move the piston or to extract energy from the movement of the piston;

the fluid alternatingly being compressed by a ratio of compression denoted as Rc, and being expanded by a ratio of expansion denoted as $R_E$, and the Atkinson ratio being denoted as A and defined as $A=R_E/R_C$;

the fluid at the beginning of compression having an absolute temperature $T_1$ degrees K and an absolute pressure of $P_1$ kilopascals, the cylinder having a bore with a diameter of B millimeters; and the engine operationally satisfying the inequality, $0.9 \leq X \leq R_C \leq 1.1$ X, wherein X has the value $$X = 0.3995\frac{(T_1/P_1)^{1.593}}{B^{0.363}}R_E + 15.36.$$

3. An internal combustion engine comprising:

a cylinder;

a compressible fluid within one portion of the cylinder;

a piston mounted to slide within the cylinder to alternatingly compress and expand the fluid;

a heat input means configured to increase the internal energy of the fluid by combustion of an injected fuel, the heat input means increasing the heat of the compressible fluid in two heat inputs, a first heat input raising the pressure at nearly constant volume, and then as the fluid initially expands a second heat input added by fuel injection, the second heat input being 20 percent or more of the combined heat input of the first heat input and the second heat input;

at least one closeable opening within the cylinder to permit transfer of the fluid into or out of the cylinder;

a power transfer means in communication with the piston configured to move the piston or to extract energy from the movement of the piston;

the fluid alternatingly being compressed by a ratio of compression denoted as Rc, and being expanded by a ratio of expansion denoted as $R_E$, and the Atkinson ratio being denoted as A and defined as $A=R_E/R_C$;

the ratio of compression being greater than 20;

the ratio of expansion being less than 50;

the Atkinson ratio being greater than 1.1;

the fluid at the beginning of compression having an absolute temperature $T_1$ degrees K and an absolute pressure of $P_1$ kilopascals, the cylinder having a bore with a diameter of B millimeters;

the engine operationally satisfying the inequality, $(1-\varepsilon)X \le R_C \le (1+\varepsilon)X$, wherein ε has a value of 0.1; and wherein X has the value $$X = 0.3995\frac{(T_1/P_1)^{1.593}}{B^{0.363}}R_E + 15.36.$$

4. A method of producing power at optimal efficiency from an internal combustion engine having a cylinder with a bore dimension B millimeters, a compressible working fluid of initial temperature $T_1$ degrees K and initial pressure $P_1$ kilopascals within one portion of the cylinder, a piston mounted to slide within the cylinder to alternatingly compress and expand the fluid, and a power transfer means in communication with the piston configured to move the piston or to extract energy from the movement of the piston, the compressible working fluid being alternatingly compressed at a compression ratio denoted as Rc, and expanded at an expansion ratio denoted as $R_E$, and having an Atkinson ratio denoted as A and defined as $A=R_E/R_C$, the compression ratio Rc selected to deviate no more than ten percent from the value of X where X is defined by $$X = 0.3995\frac{(T_1/P_1)^{1.593}}{B^{0.363}}R_E + 15.36,$$

the method comprising:

compressing a working fluid with a compression ratio, $R_C$, greater than 20;

adding heat by internal combustion to the working fluid in two heat inputs, a first heat input raising the pressure at substantially constant volume to a maximum pressure, and a second heat input added as the fluid initially expands, wherein the second heat input is 20 percent or more of the combined heat input of the first heat input and the second heat input;

expanding the working fluid with an expansion ratio, $R_E$, of less than 50, with the Atkinson ratio, A, being between 1.1 and 1.8; and extracting energy from the expansion of the working fluid, thereby producing power at high efficiency.

5. An internal combustion engine comprising:

a cylinder having a normally closed portion which contains a compressible fluid within the closed portion of the cylinder, and a back portion of the cylinder opposite the closed portion, and having a back end of the cylinder;

a closeable opening in the normally closed portion of the cylinder providing an exhaust port to selectably permit transfer of the fluid out of the cylinder;

a piston mounted to slide within the cylinder to alternatingly compress and expand the fluid, the piston having a front side facing the compressible fluid, and a back side opposite the front side;

a power transfer means in communication with the piston configured to move the piston or to extract energy from the movement of the piston;

a fuel supply means for adding fuel to the compressible fluid in the closed portion of the cylinder;

an intake port in the cylinder for allowing fluid to enter the cylinder in communication with the normally closed portion of the cylinder when the back side of the piston is substantially adjacent the back end of the cylinder;

a fluid supply means for providing compressible fluid to the intake port; and an exhaust pressure regulator in the exhaust port to selectably maintain an initial pressure of the compressible fluid in the closed portion of the cylinder when transferring exhaust out of the cylinder.

6. The internal combustion engine of claim 5 further comprising a fluid reservoir external of the cylinder and other engine components communicating between the fluid supply means and the intake port, with the operational rearward motion of the piston increasing the pressure in the reservoir.

7. The internal combustion engine of claim 6 wherein the reservoir has a plunger therein to adjustably vary the volume of the reservoir and thus to adjustably control the pressure in the reservoir developed by the rearward motion of the piston.

8. The internal combustion engine of claim 6 wherein the reservoir is sized so that the increase in pressure is not so great as to rob more than six percent of the power conveyed by the piston.

9. An opposed piston internal combustion engine, comprising:

an engine body with two cylinder bores, the cylinder bores being situated within the engine body so that each cylinder bore has a front end thereof which is near the front end of the other cylinder bore, the two cylinder bore front ends being unaligned, with the cylinder bores situated geometrically so that in a projection the cylinder bores overlap;

two pistons slidably positioned within the cylinder bores, one piston in each of said cylinder bores, to move in opposition to each other;

a partition in the engine body between the front ends of the cylinder bores sealing the front ends of the cylinder bores and having an opening through the partition which is smaller in width than the cylinder bores and connecting the two cylinder bores, the opening forming a combustion chamber within the partition;

the cylinder bores and pistons and partition forming a normally enclosed space in which is contained a compressible fluid, the enclosed space allowing communication throughout the two volumes of the cylinder bores and also the volume of the combustion chamber, the pistons being operable to compress the fluid in the enclosed space substantially into the combustion chamber;

a fluid intake means in the engine body configured to admit compressible fluid into the enclosed space;

a heat input means in the engine body configured to increase internal energy in the fluid by injection of fuel into the compressible fluid;

an exhaust port with a valve therein within the engine body to selectably permit transfer of the compressible fluid out of the enclosed space;

a power transfer means attached to the pistons and configured to move the pistons or to extract energy from the movement of the pistons, and to synchronously drive the pistons so that they repeatedly compress the fluid and expand the fluid.

10. The opposed piston internal combustion engine of claim 9 wherein the cylinder bore front ends are unaligned by being offset from each other, the offset being in a direction substantially parallel to the axis of the crankshaft.

11. An opposed piston engine comprising:

a) an engine body with two cylinder bores, the cylinder bores being situated within the engine body so that each cylinder bore has a front end thereof which is near the front end of the other cylinder bore, with the cylinder bores situated geometrically so that in a projection the cylinder bores overlap;

b) two pistons slidably positioned within the cylinder bores, one piston in each of said cylinder bores, to move in opposition to each other, and to thereby contain a compressible fluid within the cylinder bores and pistons;

c) a partition in the engine body between the front ends of the cylinder bores, the partition sealing the front ends of the cylinder bores and the partition having an opening therethrough, the opening combining with piston faces to form a combustion chamber within the partition having transverse and axial dimensions which are substantially equal, and which are substantially smaller than the cylinder bore width, and into which combustion chamber the compressible fluid is substantially compressed when the pistons approach the partition.

* * * * *